(12) United States Patent
Anchan

(10) Patent No.: US 8,490,174 B2
(45) Date of Patent: Jul. 16, 2013

(54) TRANSMITTING KEEP-ALIVE PACKETS ON BEHALF OF A MOBILE COMMUNICATIONS DEVICE WITHIN A WIRELESS COMMUNICATIONS SYSTEM

(75) Inventor: KiranKumar Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 12/949,777

(22) Filed: Nov. 18, 2010

(65) Prior Publication Data

US 2012/0131663 A1   May 24, 2012

(51) Int. Cl.
*H04L 29/06* (2006.01)
(52) U.S. Cl.
USPC ............................................................ 726/13
(58) Field of Classification Search
USPC ............................................................ 726/13
See application file for complete search history.

(56) References Cited

U.S. PATENT DOCUMENTS

| | | | | |
|---|---|---|---|---|
| 2004/0203749 A1* | 10/2004 | Iyer et al. | ................... | 455/432.1 |
| 2007/0140159 A1* | 6/2007 | Eronen et al. | ................. | 370/328 |
| 2007/0298848 A1* | 12/2007 | Babin | ........................... | 455/574 |
| 2010/0278101 A1* | 11/2010 | Bengtsson et al. | ............ | 370/328 |

FOREIGN PATENT DOCUMENTS

EP       1798890 A1    6/2007

OTHER PUBLICATIONS

International Search Report and Written Opinion—PCT/US2011/061501—ISA/EPO—Feb. 22, 2012.

* cited by examiner

*Primary Examiner* — Michael S McNally
(74) *Attorney, Agent, or Firm* — Raphael Freiwirth

(57) ABSTRACT

In an embodiment, a mobile communications device (MCD) is positioned within an internal network that is separated from an external network by network address translation (NAT) and/or a firewall. The MCD establishes settings with the NAT and/or firewall by which the MCD can be contacted through from the external network. The settings are configured to be disabled by the NAT and/or firewall after a threshold period of traffic inactivity. An application server receives information associated with the settings, and instructs an assisting application server (AAS) within the internal network to transmit keep-alive packets on behalf of the MCD so as to maintain the settings for the MCD. The AAS receives the instructions from the application server, and instructs an assisting wireless communications device (WCD) within the internal network to transmit keep-alive packets on behalf of the MCD. The WCD then transmits the keep-alive packets in accordance with the instructions.

35 Claims, 14 Drawing Sheets

TRANSMITTING KEEP-ALIVE PACKETS ON BEHALF OF A MOBILE COMMUNICATIONS DEVICE WITHIN A WIRELESS COMMUNICATIONS SYSTEM

BACKGROUND OF THE INVENTION

1. Field of the Invention

Embodiments of the invention relate to transmitting keep-alive packets on behalf of a mobile communications device within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a mobile communications device (MCD) is positioned within an internal network that is separated from an external network by network address translation (NAT) and/or a firewall. The MCD establishes settings with the NAT and/or firewall by which the MCD can be contacted through from the external network. The settings are configured to be disabled by the NAT and/or firewall after a threshold period of traffic inactivity. An application server receives information associated with the settings, and instructs an assisting application server (AAS) within the internal network to transmit keep-alive packets on behalf of the MCD so as to maintain the settings for the MCD. The AAS receives the instructions from the application server, and instructs an assisting wireless communications device (WCD) (e.g., using the same air interface mechanism as the MCD located within the internal network) to transmit keep-alive packets on behalf of the MCD. The WCD then transmits the keep-alive packets in accordance with the instructions.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
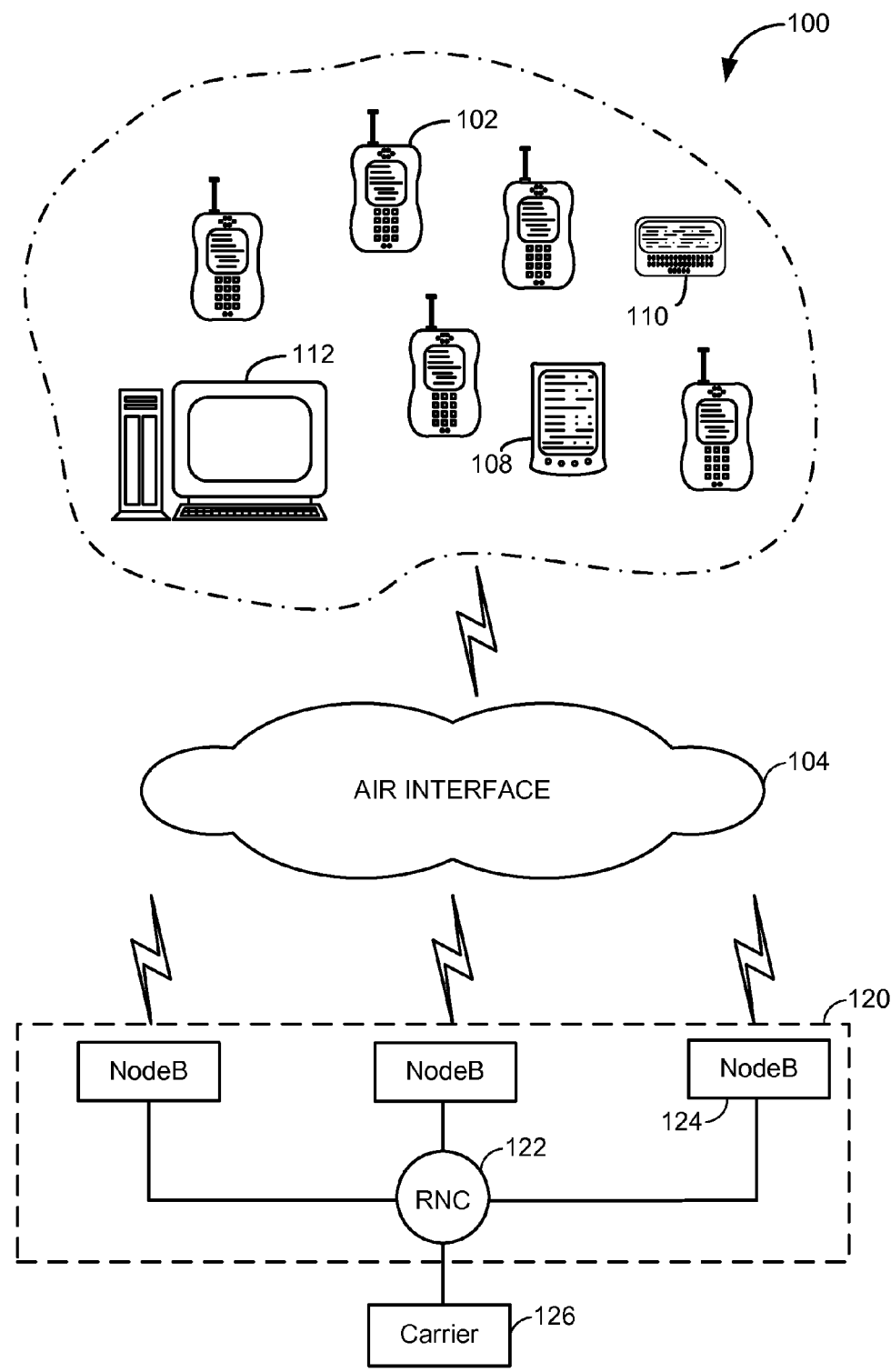
FIG. 1 is a diagram of a wireless network architecture that supports UEs and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as a user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
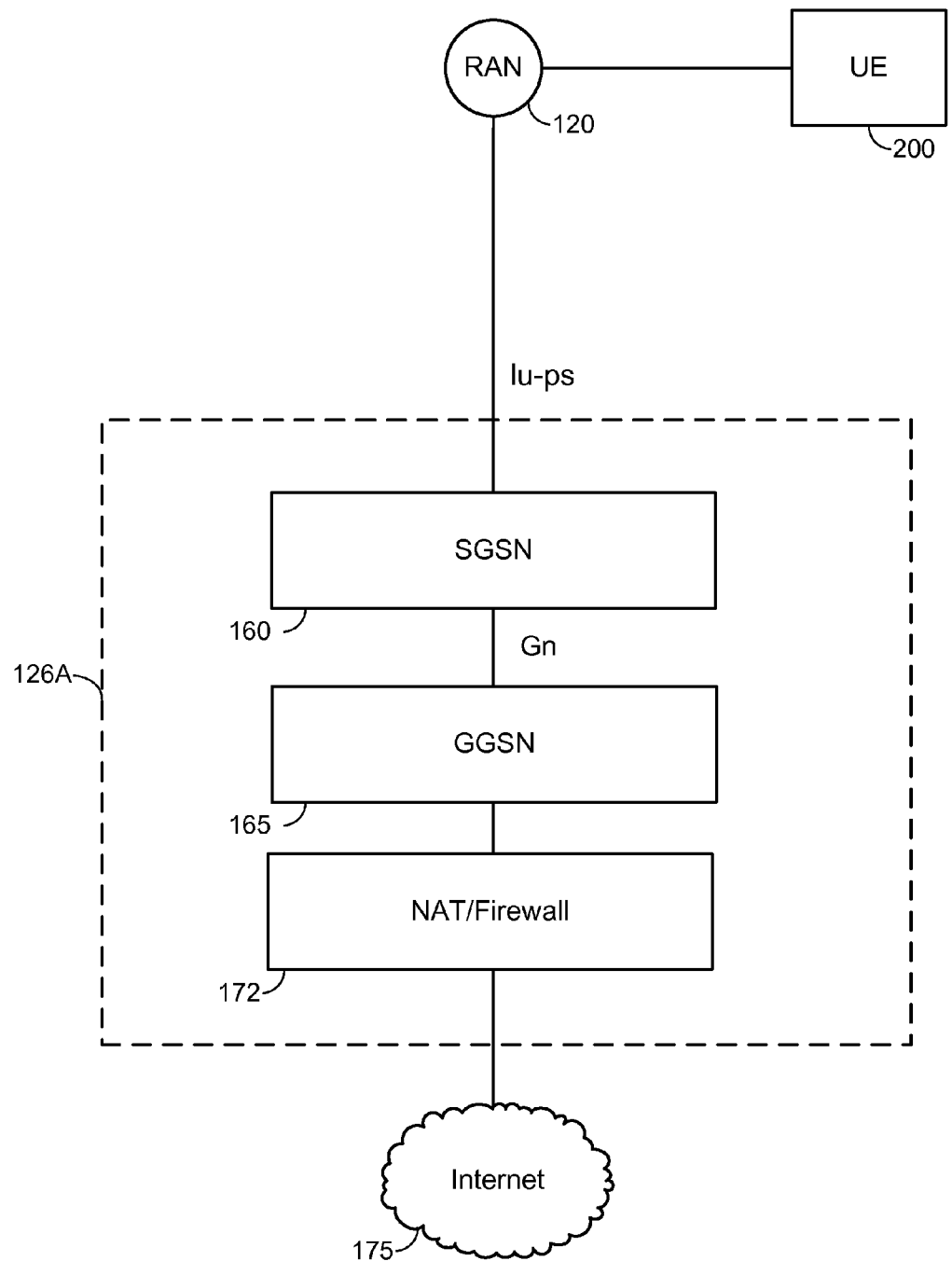
FIG. 2A illustrates the core network of FIG. 1 according to an embodiment of the present invention.

FIG. 2A illustrates the core network 126 of FIG. 1 according to an embodiment of the present invention. In particular, FIG. 2A denotes the core network or packet core 126 as 126A, whereby the core network 126A corresponds to a General Packet Radio Services (GPRS) core network implemented within a W-CDMA system. In the embodiment of FIG. 2A, the core network 126A includes a Serving GPRS Support Node (SGSN) 160, a Gateway GPRS Support Node (GGSN) 165 and a Network Address Translation (NAT) Firewall 172. The components of the core network 126A are connected to an external data packet network (or Internet) 175, and through the Internet 175 are further connected to an application server 170 (shown in FIG. 2B). However, it is appreciated that portions of the Internet 175 and/or other components may be located inside of the core network 126A in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reachability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network, or Internet 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126A, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

Referring to FIG. 2A, the RAN 120 (e.g., or UTRAN, in Universal Mobile Telecommunications System (UMTS) system architecture) communicates with the SGSN 160 via an Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Referring to FIG. 2A, the NAT/Firewall 172 is positioned between the GGSN 165 and the Internet 175. The NAT/Firewall 172 separates the core network 126A from the Internet 175 and/or other core networks. For example, the NAT/Firewall 172 may perform NAT functionality such that network address information in datagram (IP) packet headers that traverse the NAT-portion are modified such that outgoing Internet Protocol (IP) packets appear to originate from the NAT-portion instead of the originator of the IP-packet. NAT can be implemented in a variety of schemes of translating addresses and/or port numbers, with each type of NAT-scheme affecting application communication protocols differently. For example, NAT-types include full-cone NAT (also known as one-to-one NAT), address-restricted cone NAT, port-restricted cone NAT and symmetric NAT.

Firewalls can be implemented in hardware, software or a combination of both. Firewalls are frequently used to prevent unauthorized Internet users from accessing private networks, such as intranets, that are connected to the Internet 175. The NAT/Firewall 172 is configured to permit or deny network transmissions based upon a set of rules and other criteria. All messages entering or leaving the intranet pass through the firewall, which inspects each message and blocks those that do not meet the specified security criteria.

Firewalls often have functionality to protect hosts behind the network by implementing network address translation (NAT) functionality. The firewall provides private addresses as defined in RFC 1918 to the hosts protected behind a firewall. Once a pass through connection is opened through the firewall, NAT translation association for the data session is often released within a few seconds of data inactivity for the session. Thus, the NAT/Firewall 172 is used to collectively refer to the hardware and/or software that performs the firewall and NAT functions for a particular intranet.

Referring to FIG. 2A, when the UE 200 executes a client-application that interacts with an application being hosted by the application server 170, which is external to (i.e., not behind) the core network 126A, it will be appreciated that this interaction must typically comply with the NAT and/or firewall rules or settings of the core network 126A as enforced by the NAT/Firewall 172. For example, as will be described in greater detail below, dormant or idle connections between the UE 200 and the application server 170 may be shut down by the NAT/Firewall 172, such that when the application server 170 attempts to send data to the UE 200 the connection requires re-establishment. The UE 200 can mitigate this problem somewhat by sending periodic keep-alive packets over this connection during dormant or idle periods so that the NAT/Firewall 172 detects activity on the connection and refrains from shutting the connection down. However, it will be appreciated that transmitting 'dummy' packets in this manner drains battery life on the UE 200.

Figure 2B:
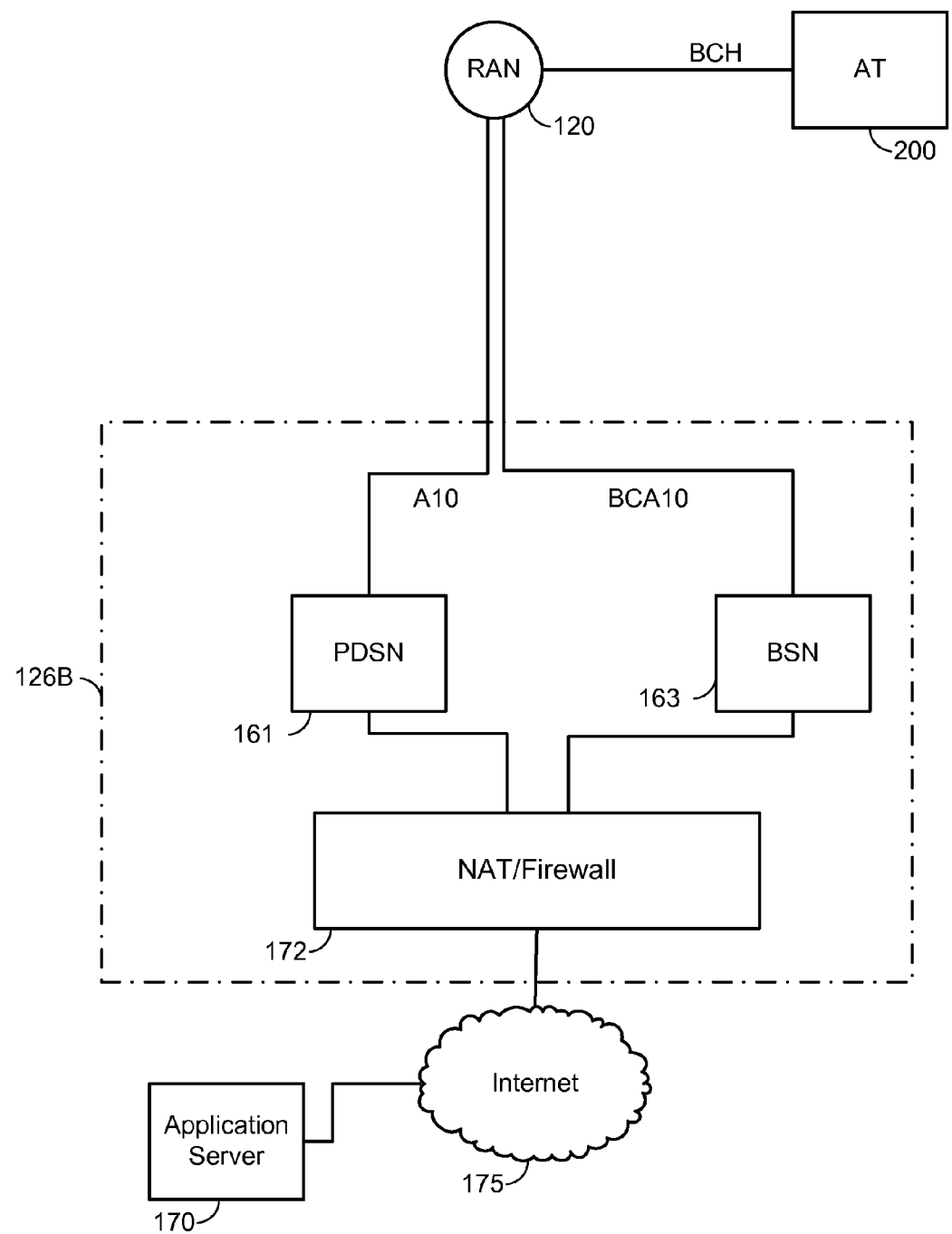
FIG. 2B illustrates the core network of FIG. 1 according to another embodiment of the present invention.

FIG. 2B illustrates the carrier network 126 of FIG. 1 according to another embodiment of the present invention. In particular, FIG. 2B denotes the core network or packet core 126 as 126B, whereby the core network 126B corresponds to an EV-DO core network. Accordingly, because FIG. 2B is specific to EV-DO systems instead of W-CDMA as in FIG. 2A, the mobile stations in FIG. 2B are described as ATs instead of UEs, and so on.

In the embodiment of FIG. 2B, the core network 126B includes a packet data serving node (PDSN) 161, a broadcast serving node (BSN) 163 and the NAT/Firewall 172. Similar to the core network 126A of FIG. 2A, the components of the core network 126B are connected to an external data packet network (or Internet) 175, and through the Internet 175 are further connected to the application server 170. However, it is appreciated that portions of the Internet 175 and/or other components may be located inside of the core network 126B in alternative embodiments.

Referring to FIG. 2B, the PDSN 161 provides access to the Internet 175, intranets and/or remote servers (e.g., application server 170) for mobile stations (e.g., access terminals, such as 102, 108, 110, 112 from FIG. 1) utilizing, for example, a CDMA2000 Radio Access Network (RAN) (e.g., RAN 120 of FIG. 1). Acting as an access gateway, the PDSN 161 may provide simple IP and mobile IP access, foreign agent support, and packet transport. The PDSN 161 can act as a client for Authentication, Authorization, and Accounting (AAA) servers and other supporting infrastructure and provides mobile stations with a gateway to the IP network as is known in the art. As shown in FIG. 2B, the PDSN 161 may communicate with the RAN 120 (e.g., the BSC/RNC 122) via a conventional A10 connection. The A10 connection is well-known in the art and will not be described further for the sake of brevity.

Referring to FIG. 2B, the broadcast serving node (BSN) 163 may be configured to support multicast and broadcast services. The BSN 163 communicates with the RAN 120 (e.g., the BSC/RNC 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 161 via the Internet 175, and sends multicast messaging to the BSN 163 via the Internet 175. Generally, the RAN 120 can transmit multicast messages, received from the BSN 163 via the BCA10 connection, over a broadcast channel (BCH) of the air interface 104 to one or more access terminals 200.

Referring to FIG. 2B, similar to FIG. 2A, the NAT/Firewall 172 is positioned between the PDSN 161 and/or BSN 163 and the Internet 175. The NAT/Firewall 172 may be co-located with the PDSN 161 or may be logically implemented as a part of the PDSN 161. The NAT/Firewall 172 separates the core network 126B from the Internet 175 and/or other core networks. For example, the NAT/Firewall 172 may perform NAT functionality such that network address information in datagram (IP) packet headers that traverse the NAT-portion are modified such that outgoing Internet Protocol (IP) packets appear to originate from the NAT-portion instead of the originator of the IP-packet. NAT can be implemented in a variety of schemes of translating addresses and/or port numbers, with each type of NAT-scheme affecting application communication protocols differently. For example, NAT-types include full-cone NAT (also known as one-to-one NAT), address-restricted cone NAT, port-restricted cone NAT and symmetric NAT.

Hereinafter, references to components within the wireless communications system 100 will for the most part be given with respect to W-CDMA-specific terminology for the sake of consistency, such as Node B, UE, RNC, GGSN, SSGN, etc. However, it will be appreciated that any of the figures described below can be implemented within the W-CDMA infrastructure (e.g., as in FIG. 2A), EV-DO infrastructure (e.g., as in FIG. 2B) and/or in accordance with infrastructure that conforms with other communication protocols.

Figure 2C:
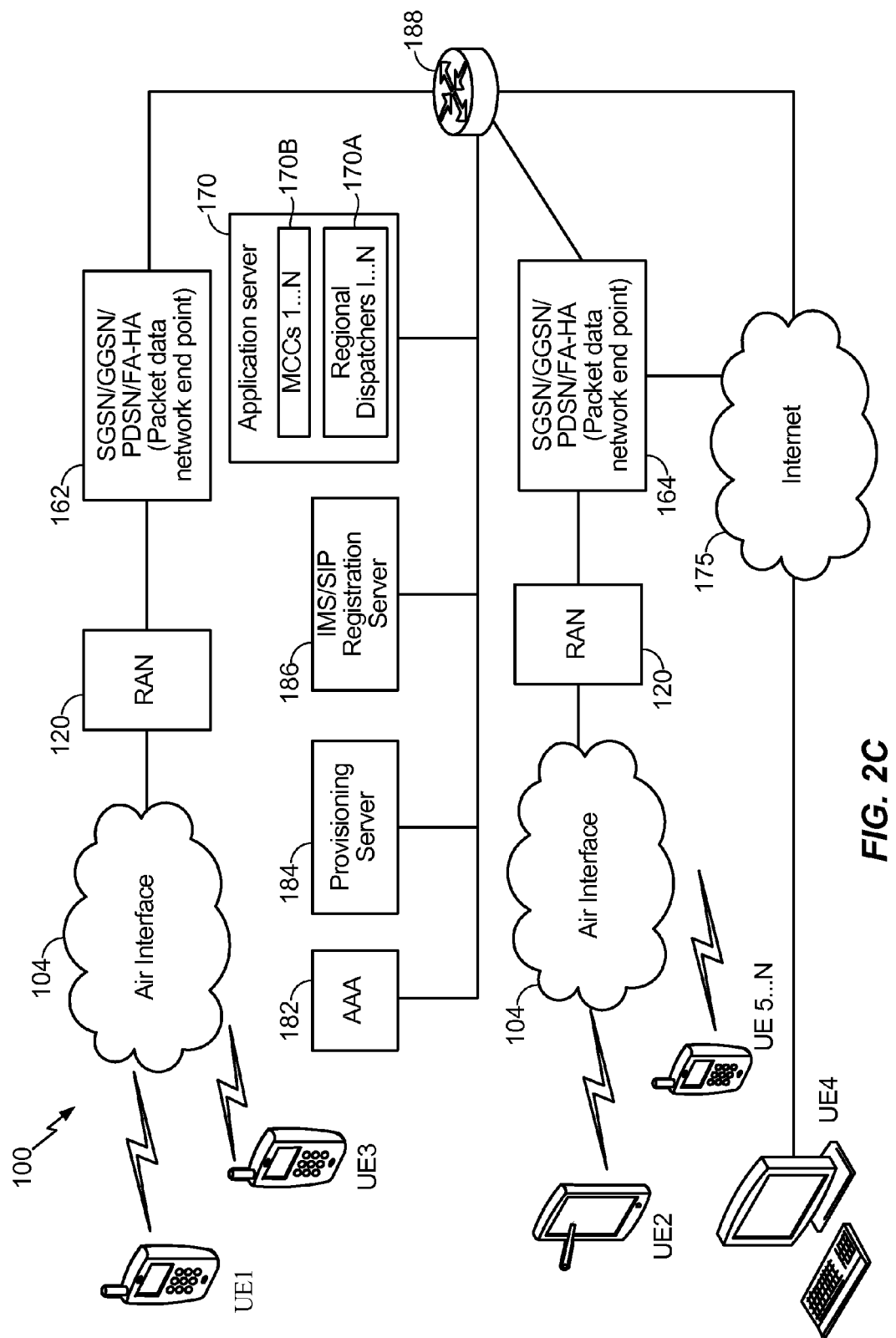
FIG. 2C illustrates an example of the wireless communications system of FIG. 1 in more detail.

FIG. 2C illustrates an example of the wireless communications system 100 of FIG. 1 in more detail. In particular, referring to FIG. 2C, UEs 1 ... N are shown as connecting to the RAN 120 at locations serviced by different packet data network end-points. The illustration of FIG. 2C is specific to W-CDMA systems and terminology, although it will be appreciated how FIG. 2C could be modified to conform with a 1x EV-DO system. Accordingly, UEs 1 and 3 connect to the RAN 120 at a portion served by a first packet data network end-point (or core network) 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 ... N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

While not shown explicitly in FIG. 2C, it will be appreciated that one or more NAT/Firewalls 172 can be positioned between the packet data network end-points 162 and 164 and the Internet 175 and/or the servers 170, 182, 184 and/or 186. Also, referring to FIG. 2C, UEs 1, 3 and 5 ... N are illustrated as wireless cell-phones, UE 2 is illustrated as a wireless tablet-PC and UE 4 is illustrated as a wired desktop station.

However, in other embodiments, it will be appreciated that the wireless communication system 100 can connect to any type of UE, and the examples illustrated in FIG. 2C are not intended to limit the types of UEs that may be implemented within the system. Also, while the AAA server 182, the provisioning server 184, the IMS/SIP registration server 186 and the application server 170 are each illustrated as structurally separate servers, one or more of these servers may be consolidated in at least one embodiment of the invention.

Further, referring to FIG. 2C, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
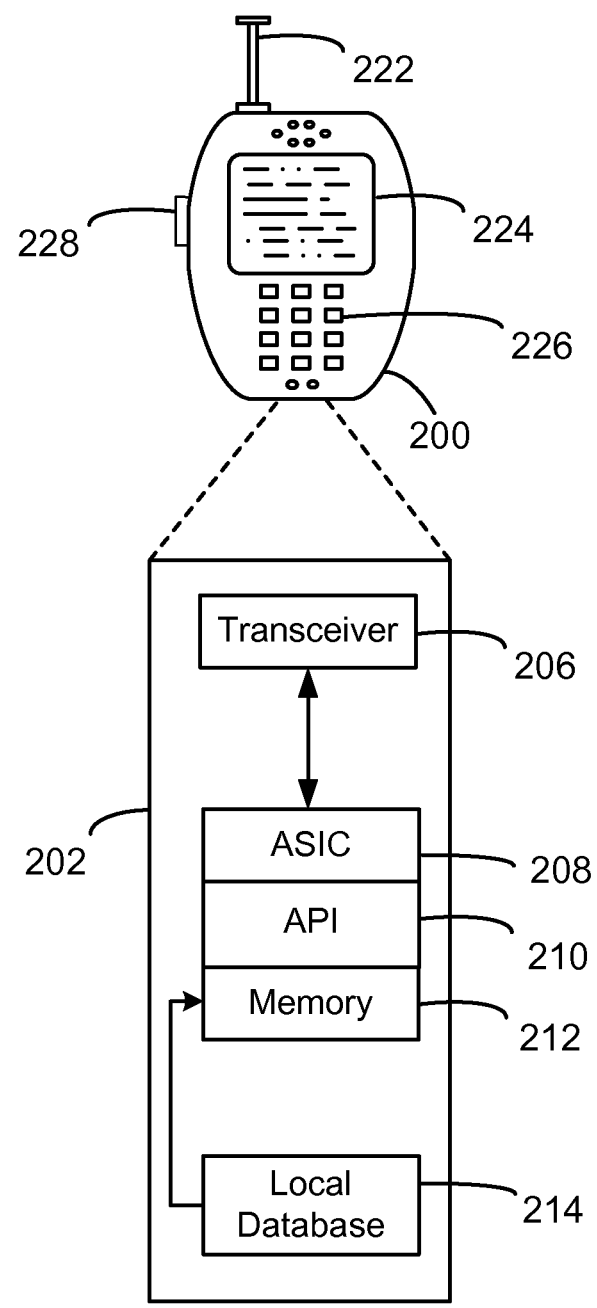
FIG. 3 is an illustration of an user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

As will be appreciated by one of ordinary skill in the art, a given UE can be configured to execute a plurality of client applications that are each configured for interaction with an application server, such as the application server 170. The application server 170 at least partially supports one or more of the plurality of client applications. For example, if the client application is a PTT client, the application server 170 can be responsible for setting up and arbitrating PTT sessions with one or more other UEs.

Accordingly, the application server 170 is expected to be able to send data to target UEs (i.e., mobile-terminated data) relatively quickly. If these target UEs are served by a core network that includes a NAT/Firewall (i.e., an 'internal' network that is separated by the NAT/Firewall from 'external' networks), as shown in FIGS. 2A and 2B for example, the mobile-terminated data from the application server 170 is required to traverse the NAT/Firewall 172 in the core network(s) of the UEs. In this case, it is typical for the client applications to implement NAT traversal technique(s) to detect the IP and port translation by the NAT/Firewall 172 and to use a keep-alive mechanism so as to maintain the NAT state. Similarly, to maintain the firewall state with the NAT/Firewall 172, the client applications on the target UEs are required to transmit periodic keep-alive packets to the application server 170, through the NAT/Firewall 172.

It will be appreciated that each client application on the given UE can potentially be required to send the keep-alive packets to one or more application servers to maintain their respective states with the NAT/Firewall 172. This means that the given UE will periodically wake up, set-up a traffic channel (TCH) with the RAN 120, transmit the keep-alive packet and then go back to sleep. As the number of client applications that are attempting to maintain their states with the NAT/Firewall 172 increases, the given UE will consume more and more power, which reduces battery life.

Figure 4:
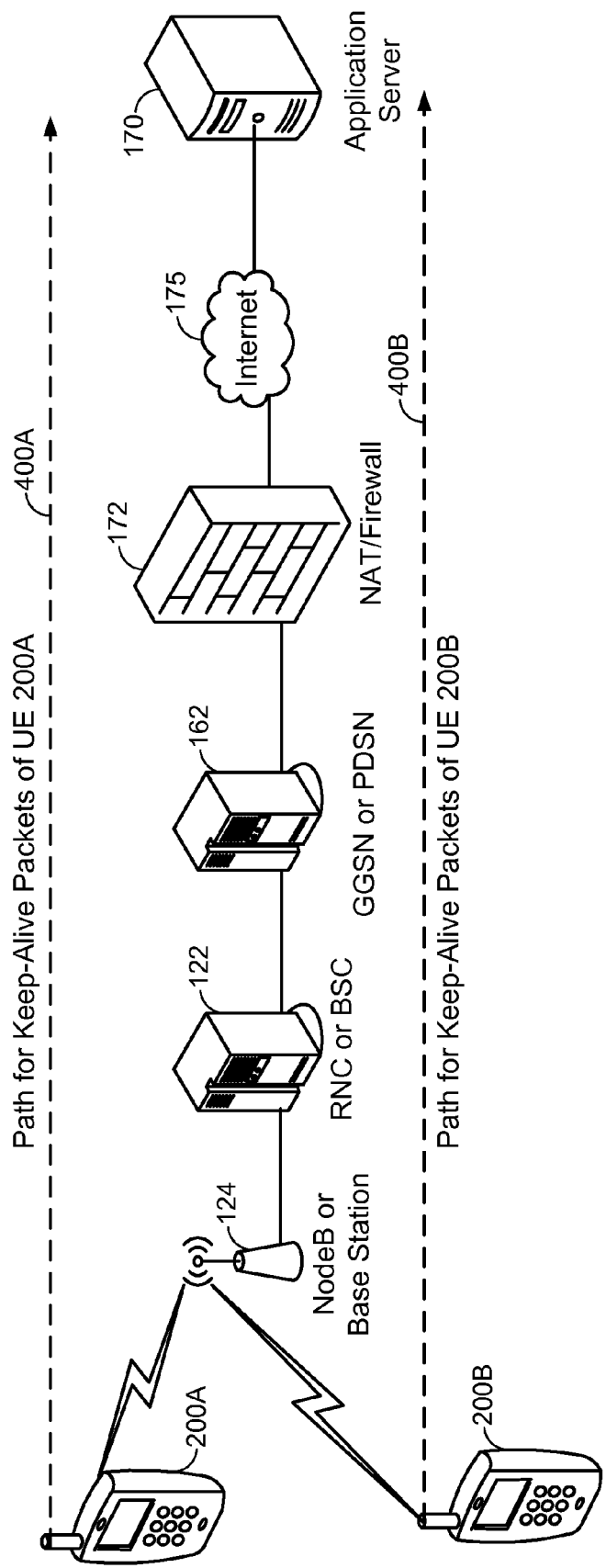
FIG. 4 illustrates an example of routing of keep-alive packets from a plurality of UEs in a core network.

FIG. 4 illustrates an example of routing of keep-alive packets from a plurality of UEs in a core network. As shown in FIG. 4, UEs 200A and 200B each send keep-alive packets over a wireless link or air interface to a serving NodeB (or base station) 124, which then forwards the keep-alive packets to a serving RNC (or BSC) 122, which in turn sends the keep-alive packets to the packet data network end-point 162 (e.g., the GGSN or PDSN) and then the NAT/Firewall 172. The NAT/Firewall 172 performs a translation function on the keep-alive packets and forwards the packets to the Internet 175. Eventually, the keep-alive packets arrive at the application server 170 and are discarded because the function of the keep-alive packets is to maintain the respective NAT and firewall states of one or more client applications of the UEs 200A and 200B with the NAT/Firewall 172. Due to the traffic associated with the keep-alive packets from UEs 200A and 200B, the respective NAT and firewall states of the one or more client applications of the UEs 200A and 200B are maintained by the NAT/Firewall 172, as will be described in more detail below. In FIG. 4, the respective routing paths of the keep-alive packets for UEs 200A and 200B are illustrated as routing path 400A and routing path 400B, respectively.

Figure 5A:
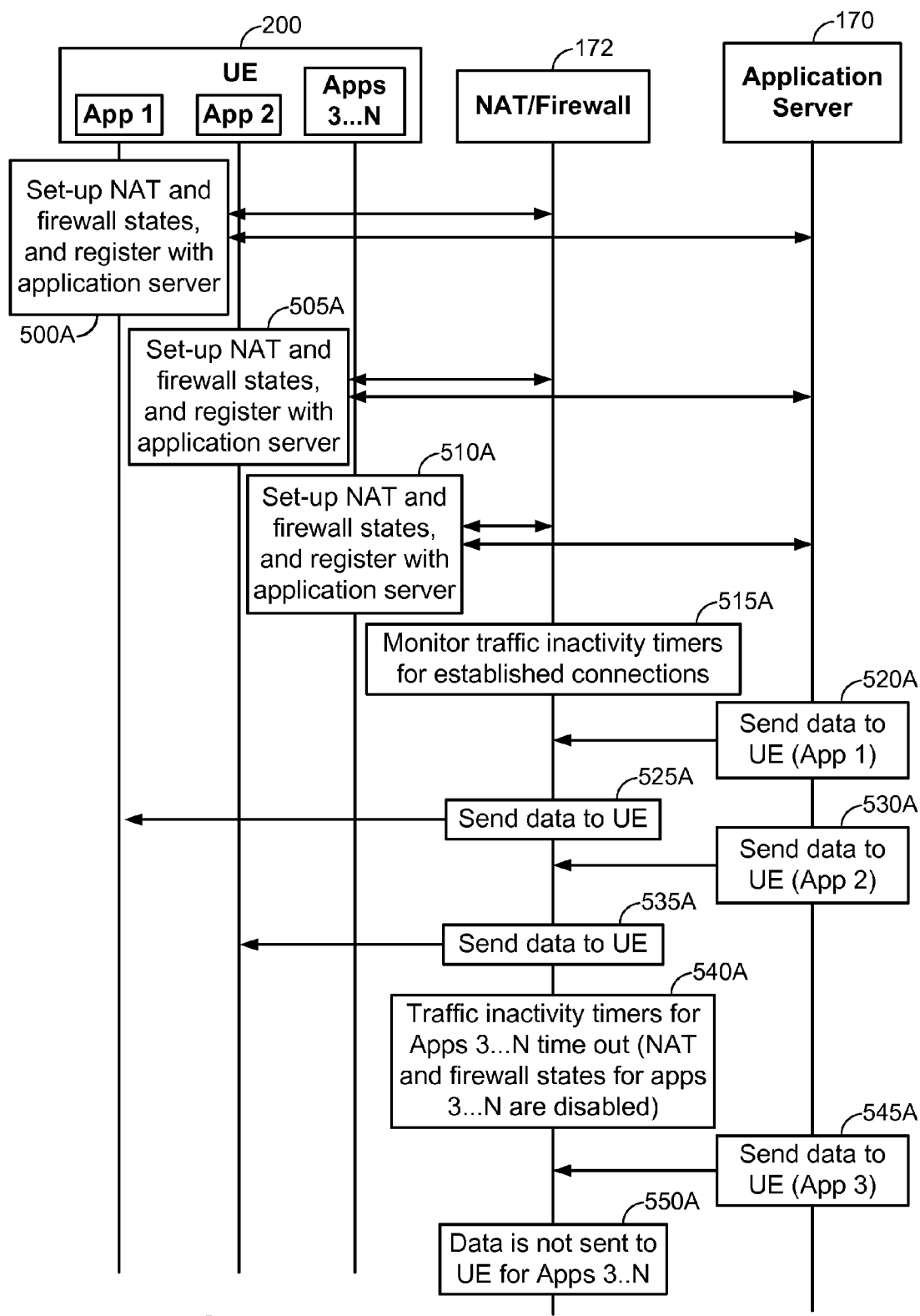
FIG. 5A illustrates a process by which an application server sends mobile-terminated data to a plurality of client applications on a given UE.

FIG. 5A illustrates a process by which the application server 170 sends mobile-terminated data to a plurality of client applications 1 . . . N on a given UE. Referring to FIG. 5A, the application server 170 is described as supporting each of the plurality of client applications 1 . . . N. However, it will be appreciated that different client applications could be supported by different application servers in other implementations of FIG. 5A.

Referring to FIG. 5A, client application 1 of the given UE sets-up its NAT and firewall states with the NAT/Firewall 172, and then registers with the application server 170, 500A. Client application 2 of the given UE also sets-up its NAT and firewall states with the NAT/Firewall 172, and then registers with the application server 170, 505A. Client applications 3 . . . N of the given UE also each set-up their respective NAT and firewall states with the NAT/Firewall 172, and each of client applications 3 . . . N then register with the application server 170, 510A. At this point, after 510A of FIG. 5A, the application server 170 is capable of sending mobile-terminated data to the given UE for any of client applications 1 . . . N because each client application is registered and has active NAT and firewall states with the NAT/Firewall 172.

As discussed above, the NAT/Firewall 172 does not maintain the NAT and firewall states for client applications 1 . . . N indefinitely. Rather, the NAT/Firewall 172 will eventually reset or disable the NAT and firewall states for one or more of the client applications 1 . . . N after a threshold period of inactivity. Accordingly, the NAT/Firewall 172 monitors traffic inactivity timers for each of the client applications 1 . . . N in 515A. As will be appreciated, each traffic inactivity timer has an associated expiration period such that the NAT and/or firewall states for a particular client application are torn down upon expiration of the associated traffic inactivity timer.

Next, while the NAT and firewall states for client application 1 remain active, the application server 170 sends mobile-terminated data to the NAT/Firewall 172 for transmission to the given UE in association with client application 1, 520A. The NAT/Firewall 172 receives the mobile-terminated data, performs any necessary translation functions and then forwards the mobile-terminated data to the RAN 120 (e.g., via a SSGN/GGSN, via a PDSN, etc.) for transmission to the given UE, 525A.

Next, while the NAT and firewall states for client application 2 remain active, the application server 170 sends mobile-terminated data to the NAT/Firewall 172 for transmission to the given UE in association with client application 2, 530A. The NAT/Firewall 172 receives the mobile-terminated data, performs any necessary translation functions and then forwards the mobile-terminated data to the RAN 120 (e.g., via a SSGN/GGSN, via a PDSN, etc.) for transmission to the given UE, 535A.

Next, assume that the traffic inactivity timer(s) for client applications 3 . . . N expire at the NAT/Firewall 172, 540A, such that the NAT/Firewall 172 tears down the NAT and/or firewall states that were set-up for client applications 3 . . . N, 540A. At this point, the NAT/Firewall 172 will no longer be able to forward IP packets to/from the given UE based on the NAT and/or firewall states that were set-up in 510A and are now torn down.

Referring to FIG. 5A, after the NAT and firewall states for apps 3 . . . N are torn down in 540A, assume that the application server 170 sends mobile-terminated data to the NAT/Firewall 172 for transmission to the given UE in association with client application 3, 545A. The NAT/Firewall 172 receives the mobile-terminated data, but the mobile-terminated data is not forwarded to the given UE because the NAT and/or firewall states for client application 3 are no longer active, 550A.

Figure 5B:
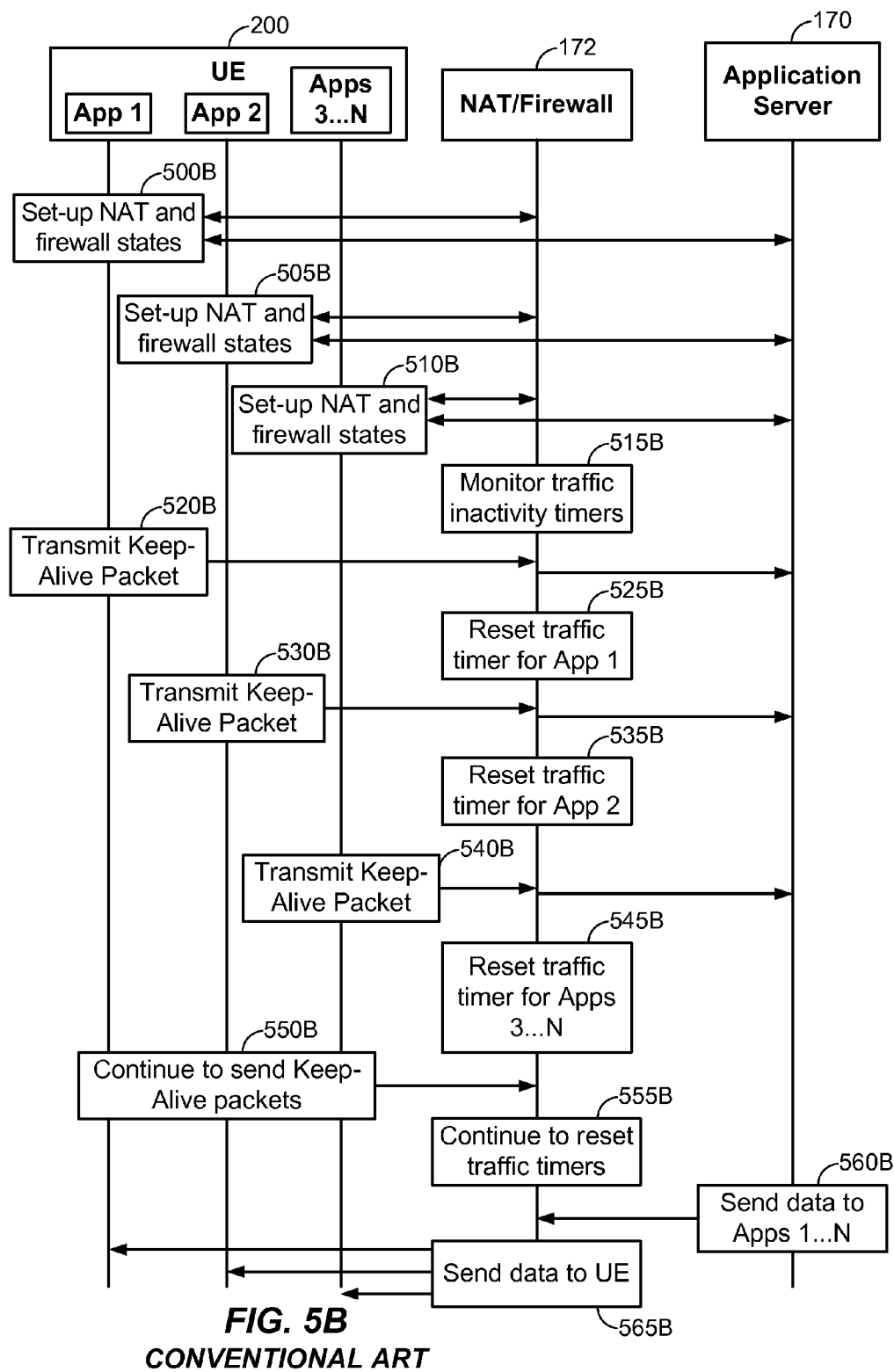
FIG. 5B illustrates another process by which the application server sends mobile-terminated data to a plurality of client applications on the given UE.

FIG. 5B illustrates another process by which the application server 170 sends mobile-terminated data to a plurality of client applications 1 . . . N on the given UE. Referring to 5B, as in FIG. 5A, the application server 170 is described as supporting each of the plurality of client applications 1 . . . N. However, it will be appreciated that different client applications could be supported by different application servers in other implementations of FIG. 5B.

Referring to FIG. 5B, 500B through 515B correspond to 500A through 515A, respectively, of FIG. 5A and as such will not be described further for the sake of brevity. After the NAT and firewall states for client applications 1 . . . N are set-up, the client applications each begin transmitting periodic keep-alive packets to the application server 170 (e.g., along routing paths 400A/400B as shown in FIG. 4) so as to maintain the respective NAT and firewall states. Accordingly, after a given period of time that is no greater than the expiration period of the traffic interactivity timer(s), the given UE periodically wakes up, sets-up a traffic channel (TCH) with the RAN 120, transmits a keep-alive packet for client application 1 to the application server 170 via the NAT/Firewall 172 and then goes back to sleep (at least, if the given UE is otherwise dormant or idle), 520B. The NAT/Firewall 172 detects traffic in association with the NAT and/or firewall states for client application 1 and resets or restarts the traffic inactivity timer for client application 1, 525B.

The transmission of the keep-alive packet occurs in a similar manner in 530B for client application 2 as in 520B for client application 1. Accordingly, the NAT/Firewall 172 detects traffic in association with the NAT and/or firewall states for client application 2 and resets or restarts the traffic inactivity timer for client application 2, 535B. Likewise, the transmission of the keep-alive packet occurs in a similar manner in 540B for client applications 3 . . . N as in 520B for client application 1 and/or 530B for client application 2. Accordingly, the NAT/Firewall 172 detects traffic in association with the NAT and/or firewall states for client applications 3 . . . N and resets or restarts the traffic inactivity timer(s) for client applications 3 . . . N, 545B. While the keep-alive packets for client applications 1 . . . N are shown as separate transmissions that occur at 520B, 530B and 540B, respectively, it will be appreciated that the given UE can attempt to coordinate the respective transmissions to make better use of system resources and/or battery life.

Next, each of the client applications 1 . . . N continues to send periodic keep-alive packets to the application server 170, 550B, and the NAT/Firewall 172 continues to reset the traffic inactivity timers for client applications 1 . . . N, 555B, such that their respective NAT and/or firewall states are maintained. At some later point in time, the application server 170 sends mobile-terminated data to the NAT/Firewall 172 for transmission to the given UE in association with any of client applications 1 . . . N, 560B. The NAT/Firewall 172 receives the mobile-terminated data, performs any necessary translation functions and then forwards the mobile-terminated data to the RAN 120 (e.g., via a SSGN/GGSN, via a PDSN, etc.) for transmission to the given UE, 565B.

As will be appreciated from a review of FIGS. 5A and 5B, the given UE can conserve battery power by refraining from sending the periodic keep-alive packets as in FIG. 5A. However, this risks losing the NAT and/or firewall states with the NAT/Firewall 172 such that mobile-terminated data intended for a client application on the given UE will be lost. Alternatively, the given UE can transmit the keep-alive packets such that the NAT and/or firewall states are maintained as in FIG. 5B, albeit at the expense of increased power consumption at the given UE. Embodiments of the invention that will be described in more detail below are directed to a keep-alive packet transmission assistance mechanism whereby the given UE is 'assisted' by one or more other UEs in the same core network or packet core whereby the one or more other UEs send keep-alive packets on behalf of the given UE.

Figure 6A:
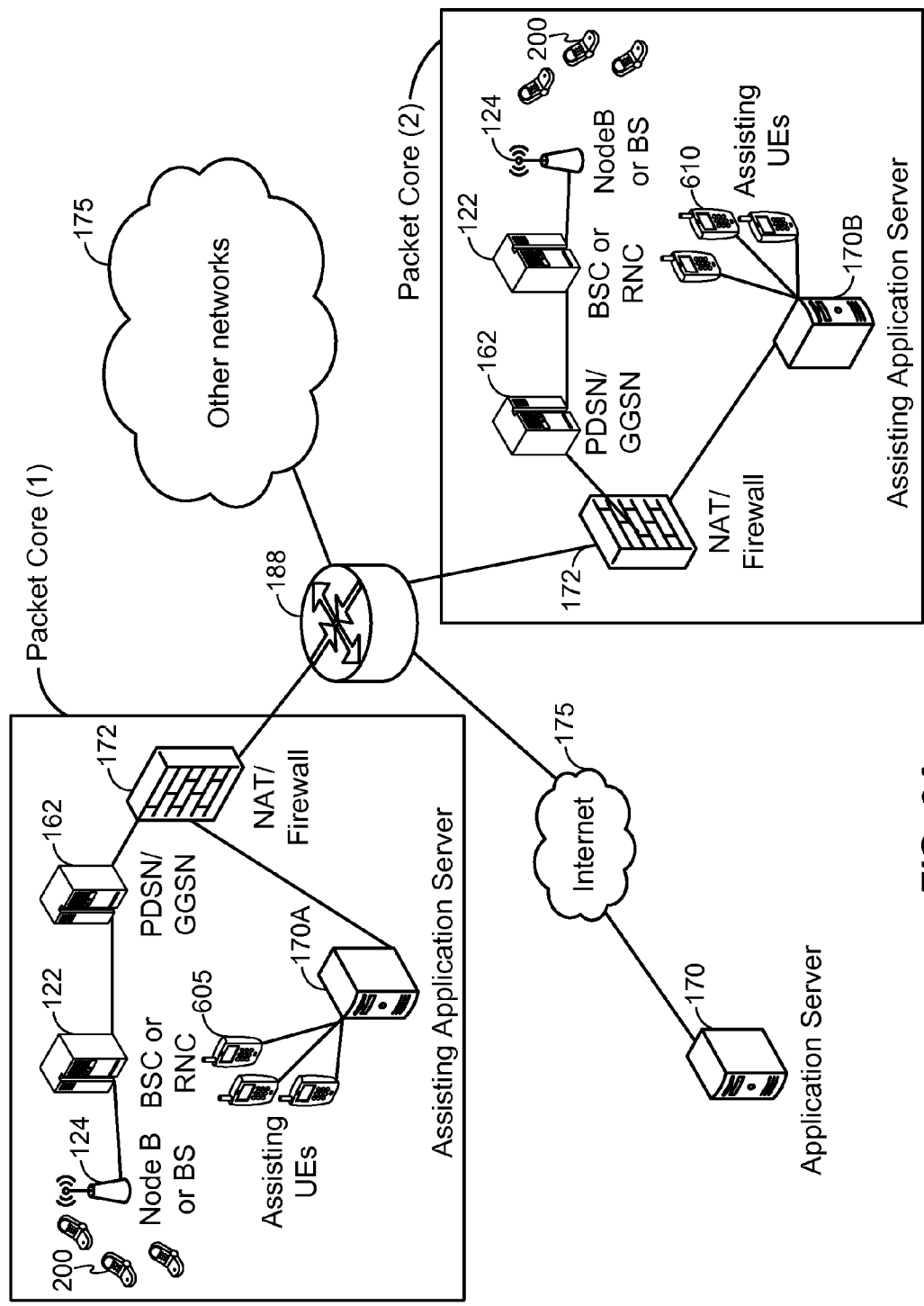
FIG. 6A illustrates a wireless communications system in accordance with an embodiment of the invention.

FIG. 6A illustrates a wireless communications system in accordance with an embodiment of the invention. FIG. 6A borrows certain components from FIGS. that were already described above, and any like-numbered components will not be described in further detail at this point for the sake of brevity.

Referring to FIG. 6A, a first packet core (1) and a second packet core (2) are illustrated. The packet core (1) includes the NAT/Firewall 172 as well as any network components that are 'behind' the NAT/Firewall 172. Similarly, the packet core (2) includes another NAT/Firewall 172 as well as any network components that are 'behind' the other NAT/Firewall 172. Thus, the term 'packet core' is generally used to refer to an internal network that can be reached by external devices or networks, such as the application server 170, through a particular NAT/Firewall 172. For example, the packet core (1) includes the NAT/Firewall 172, the GGSN (or PDSN) 162 and the RAN 120 (which includes a Node B 124 and RNC 122, or a BS 124 and BSC 122). A plurality of UEs 200 can connect to the RAN 120 in the packet core (1). Similar infrastructure is included in the packet core (2) and will not be described further for the sake of brevity.

Referring to FIG. 6A, the packet core (1) further includes an assisting application server (AAS) 170A. The AAS 170A is a server that is configured to interact with the application server 170 and is coupled in some manner to the NAT/Firewall 172 within packet core (1). The coupling of the AAS 170A to the packet core (1) can be achieved by maintaining a mapping of a particular AAS 170A to the IP address of the packet core (1) elements, like the GGSN or the PDSN 162, at the application server 170. In an example, the AAS 170A can correspond to a wireline device that need not have explicit wireless functionality, although in at least one embodiment the AAS 170A could also be configured with its own wireless transceiver so as to conduct wireless communications.

The AAS 170A is also coupled to one or more 'assisting' UEs 605. The assisting UEs 605 are configured for wireless connectivity, and can connect to the RAN 120 within the packet core (1) in the same manner as the UEs 200. In an embodiment, the assisting UEs 605 can be connected to a permanent power source so that their power consumption is not a critical issue. Alternatively, it is possible that one or more of the assisting UEs could be deployed as mobile devices that rely at least partially on battery power. In an alternative embodiment, multiple AAS 170A can be deployed in a given packet core (1) when a relatively high number of client applications configured to receive keep alive-packet assistance are deployed in the given packet core (1). Similarly, the packet core (2) includes an AAS 170B that is coupled to the NAT/Firewall 172 of the packet core (2) and is also coupled to one or more assisting UEs 610. The AAS 170B in the packet core (2) can be configured similar to the AAS 170A in the packet core (1). The operation of the application server 170 with the AASs 170A and 170B as well the assisting UEs 605 and 610 will be described in more detail below with respect to FIGS. 7A through 7D.

Figure 6B:
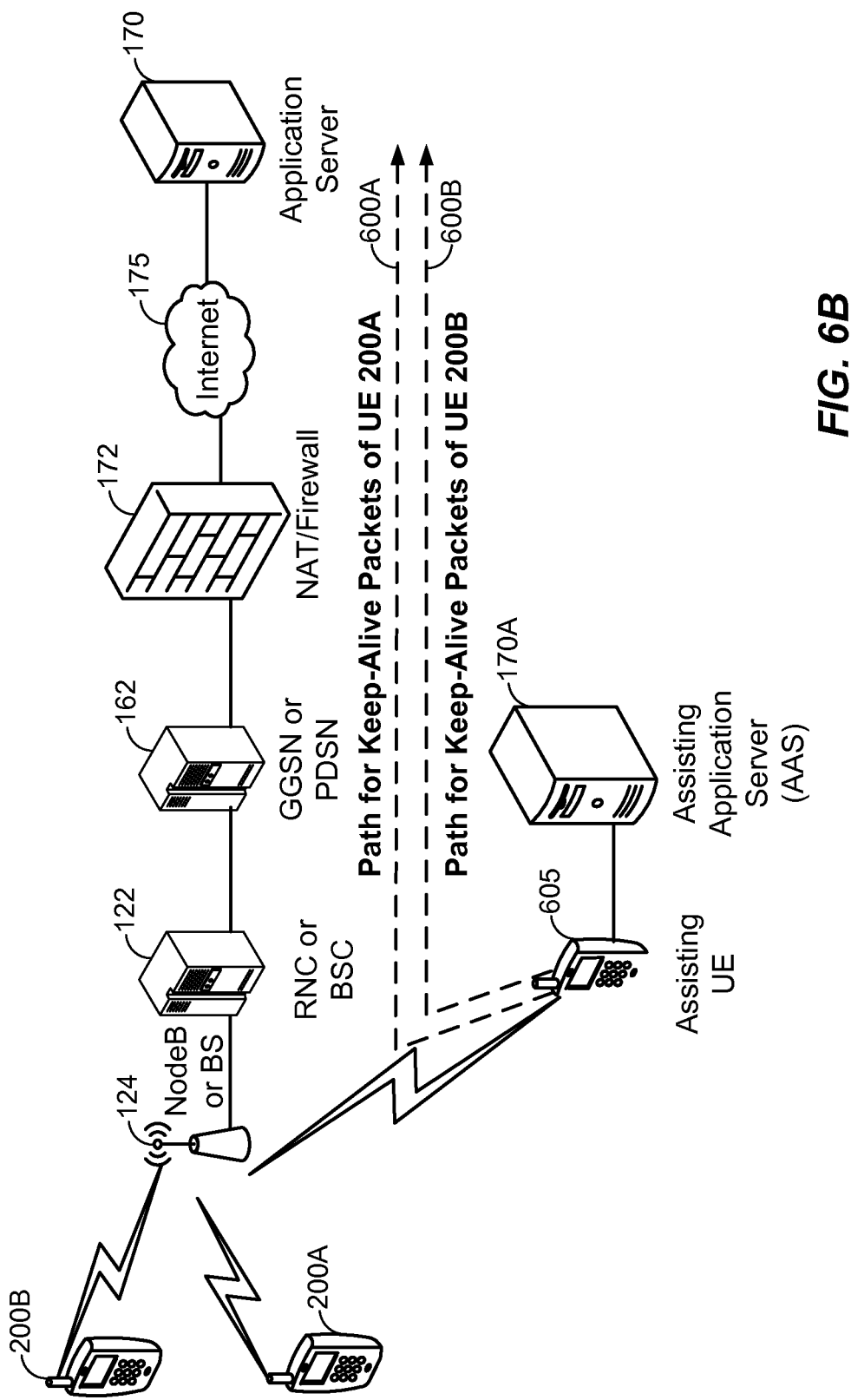
FIG. 6B illustrates an example of routing of keep-alive packets from a plurality of UEs in a packet core of FIG. 6A in accordance with an embodiment of the invention.

FIG. 6B illustrates an example of routing of keep-alive packets from a plurality of UEs in the packet core (1) of FIG. 6A in accordance with an embodiment of the invention. As shown in FIG. 6B, UEs 200A and 200B are not actually responsible for sending their own keep-alive packets to the application server 170. Rather, the application server 170 instructs the AAS 170A to have one or more assisting UEs 605 send the keep-alive packets on behalf of UEs 200A and 200B. In an example, the application server 170 selects the AAS 170A depending on the IP address of the packet core (1) provided by the UE 200A and 200B during the registration. The registration process of the UE 200A and 200B with the application server 170 also provides, to the application server 170, the public IP address and the port as assigned by the NAT/Firewall 172 used for communication with the application server 170 through the NAT/Firewall 172.

Referring to FIG. 6B, after selecting the AAS 170A, the application server 170 provides the public IP address and the ports to the AAS 170A for UE 200A and 200B. The AAS 170A leverages or instructs the assisting UE(s) 605 to send keep-alive packets on behalf of UEs 200A and 200B over a wireless link or air interface to a serving NodeB (or base station) 124, which then forwards the keep-alive packets to a serving RNC (or BSC) 122, which in turn sends the keep-alive packets to the packet data network end-point (e.g., the GGSN or PDSN) 162 and then the NAT/Firewall 172. The NAT/Firewall 172 performs a translation function on the keep-alive packets and forwards the packets to the Internet 175. Eventually, the keep-alive packets arrive at the application server 170 and can be discarded because the function of the keep-alive packets is to maintain the respective NAT and firewall states of one or more client applications of the UEs 200A and 200B with the NAT/Firewall 172.

As will be explained in greater detail below, in an embodiment, in order to ensure that the NAT state for the IP and Port of the UEs 200A and 200B is maintained, the assisting UE(s) 605 are configured to send keep-alive packets by replacing the source IP address of UE 605 with the source IP address of UEs 200A and 200B in the IP headers of the keep alive packets of the respective UEs sent to the application server 170. Similarly, the source port of assisting UE(s) 605 are replaced with the source port used the UEs 200A and 200B in the UDP or the TCP headers of the keep alive packets. At the NAT/Firewall 172, the source IP address, source port, destination IP address and destination port of the keep alive packets from the assisting UE(s) 605 'mimic' the corresponding settings of packets sent from UE 200A and 200B, the NAT/Firewall 172 state for UEs 200A and 200B is maintained. Due to the traffic associated with the keep-alive packets from UEs 200A and 200B, the respective NAT and firewall states of the one or more client applications of the UEs 200A and 200B are maintained by the NAT/Firewall 172.

In FIG. 6B, the respective routing paths of the keep-alive packets for UEs 200A and 200B are illustrated as routing path 600A and 600B, respectively. Unlike FIG. 4, it will be appreciated that the routing paths 600A and 600B originate from the assisting UE(s) 605 instead of the UEs 200A and 200B such that the power consumption of UEs 200A and 200B can be reduced while maintain their respective NAT and/or firewall states with the NAT/Firewall 172 of the packet core (1).

Figure 7A:
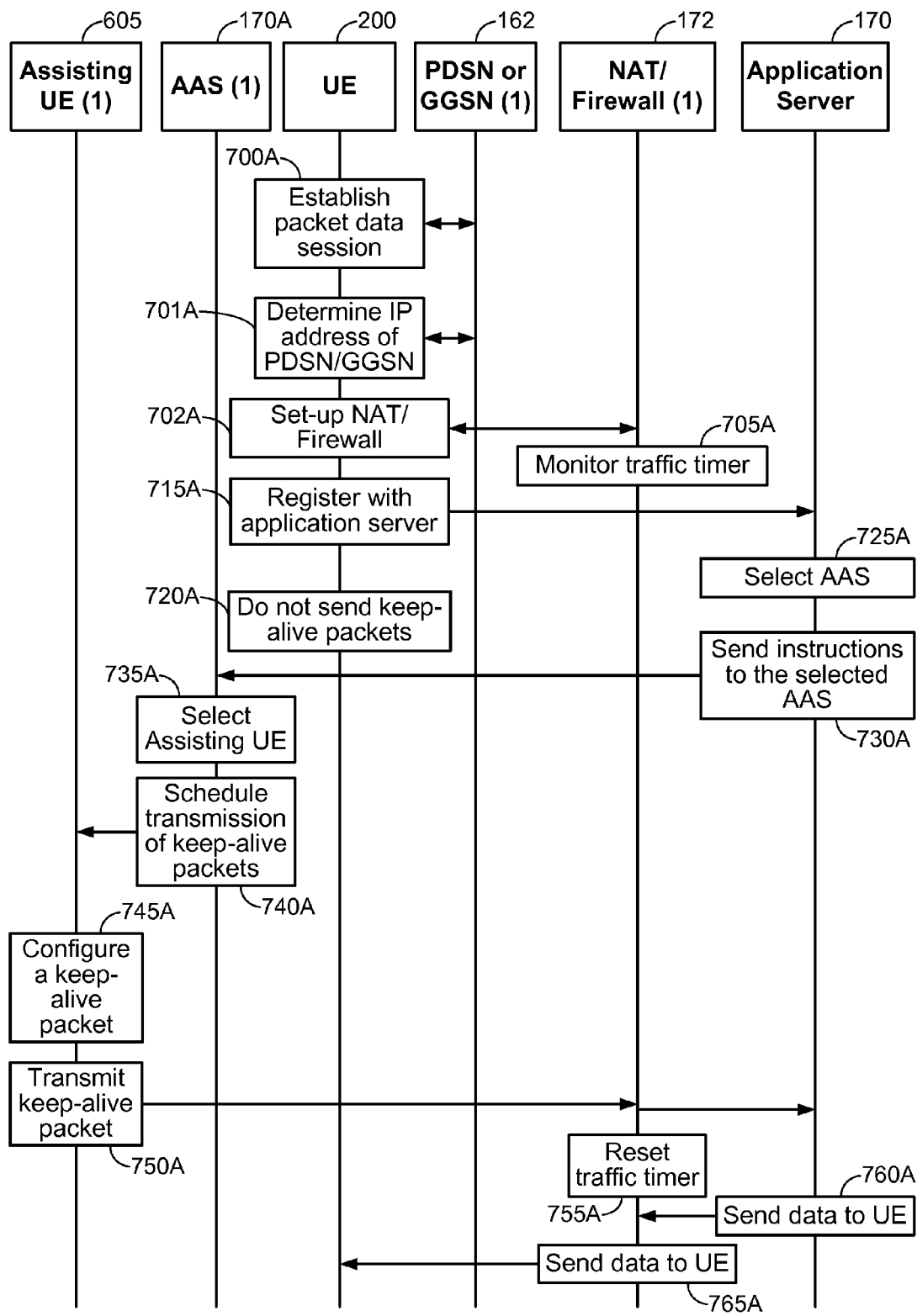
FIG. 7A illustrates a process by which the application server sends mobile-terminated data to one or more client applications on a given UE in accordance with an embodiment of the invention.

FIG. 7A illustrates a process by which the application server 170 sends mobile-terminated data to one or more client applications on a given UE ("UE 200") in accordance with an embodiment of the invention. FIG. 7A is described below with respect to the keep-alive packets that are sent in association with one particular client application. However, it will be appreciated how the process of FIG. 7A can scale to accommodate any number of client applications. Also, while FIG. 7A is generally described with references to components within packet core (1), it will be appreciated that the process of FIG. 7A can alternatively be implemented in any packet core or internal network that separated from external networks via the NAT/Firewall 172.

Referring to FIG. 7A, a given client application on UE 200 establishes a packet data session with a packet data end point 162 (i.e., the PDSN or GGSN) of the packet core (1), 700A. The given client application on UE 200 then obtains the IP address of the packet data end point 162 (i.e., the PDSN or GGSN) of the packet core (1), 701A. The given client application on UE 200 sets-up its NAT and firewall states with the NAT/Firewall 172, 702A. For example, in setting-up the NAT and firewall states in 702A, the given client application detects the NAT-portion of the NAT/Firewall 172, establishes public and private port numbers and IP addresses to be used for the given client application and establishes a firewall association for the given client application.

As discussed above with respect to FIGS. 5A and 5B, the NAT/Firewall 172 does not maintain the NAT and firewall states for client applications 1 . . . N indefinitely. Rather, the NAT/Firewall 172 will eventually reset or disable the NAT and firewall states for one or more of the client applications 1 . . . N after a threshold period of inactivity. Accordingly, the NAT/Firewall 172 monitors a traffic inactivity timer for the given client application, 705A. As will be appreciated, the traffic inactivity timer has an associated expiration period such that the NAT and/or firewall states for the given client application are torn down upon expiration of the associated traffic inactivity timer.

Referring to FIG. 7A, UE 200 registers the given client application with the application server 170, 715A. The registration of 715A includes conveying, from UE 200 to the application server 170, (i) the private IP address and port number for the given client application as established in 700A, (ii) the public IP address and port number for the given client application as established in 702A, and (iii) the IP address of the PDSN or GGSN, determined by UE 200 at 701A. After registering the given client application with the application server 170 in 715A, UE 200 does not send keep-alive packets to the application server 170 for maintaining the NAT and/or firewall states for the given client application with the NAT/Firewall 172, 720A. Unlike FIG. 5A, the reason UE 200 refrains from transmitting the keep-alive packets in 720A is based on an expectation that the application server 170 will facilitate some other UE(s) in the same packet core (1) to transmit keep-alive packets on behalf of UE 200 so that the NAT and/or firewall states for UE 200 are maintained.

After the application server 170 completes registration of the given client application for UE 200, the application server 170 selects an assisting application server (AAS) based on the IP address of the PDSN or GGSN that was reported by UE 200 to the application server 170 during the registration, 725A. For example, the application server 170 can use the IP address of the PDSN or GGSN to identify an AAS that associates with the application server 170 and is also located in the same packet core as UE 200, such as packet core (1). The application server 170 can then select the co-located AAS that is in the same packet core (1) as UE 200 in 725A. As will be explained in more detail below, one or more of the assisting UE(s) 605 that are coupled to the selected AAS are expected to be capable of 'masquerading' as UE 200, at least from the perspective of the NAT/Firewall 172 of the packet core (1).

After selecting the AAS 170A based on the IP address of the PDSN or GGSN in 725A, the application server 170 instructs the selected AAS to transmit keep-alive packets on behalf of the given client application of UE 200, 730A. In this case, the selected AAS corresponds to AAS 170A within the packet core (1). The AAS 170A receives the instructions from the application server 170 and then selects one or more of its coupled, assisting UEs 605 to be responsible for periodically transmitting keep-alive packets on behalf of the given client application of UE 200, 735A. For example, the selected assisting UE(s) 605 can correspond to UE(s) that are co-located with the AAS 170A and are connected to the AAS 170A via an interface like the USB or other similar interfaces. The AAS 170A can communicate with the assisting UE(s) 605 over this interface instead of using the air interface to reduce contention for bandwidth and radio resources of the assisting UE(s) 605 while the assisting UE(s) 605 are sending keep alive packets. The AAS 170A then instructs the selected assisting UE(s) 605 to begin transmitting keep-alive packets to the application server 170 on a periodic basis, 740A. In an embodiment, the period for keep-alive packet repetition is established to be no greater than the expiration timer of the associated traffic inactivity timer (e.g., 15 seconds, 30 seconds, 1 minute, etc.) that is maintained at the NAT/Firewall 172.

In 745A, the selected assisting UE(s) 605 each configure a keep-alive packet in a manner that conforms with UE 200, 745A. This essentially means that the selected assisting UE(s) 605 are each masquerading as UE 200 so as to fool the NAT/Firewall 172 into interpreting the configured keep-alive packet from the selected UE(s) 605 as if the packet actually originated from UE 200. For example, the public IP addresses and public port numbers and for UE 200 assigned by the NAT/Firewall 172 that were conveyed to the application server 170 can be passed to the AAS 170A and then to the selected assisting UE(s) 605. Instead of using their own IP address and port in the source IP and port fields of the IP headers of the keep-alive packet, the selected assisting UE(s) 605 can then use the public IP addresses and public port numbers for UE 200 in the IP (TCP/UDP) headers as the source IP address and port information to configure the keep-alive packet in 745A for transmission to the application server 170. Since the source IP address, destination IP address, source port and destination port combination used by the selected assisting UE(s) 605 within the keep-alive packet is associated with UE 200, the NAT/Firewall 172 can interpret these packets as data traffic from UE 200 and thus can extend the associated NAT settings for the given client application of UE 200.

After configuring the keep-alive packet in 745A, the selected assisting UE(s) 605 sets-up a TCH with the RAN 120 (if necessary), transmits the configured keep-alive packet to the application server 170 via the NAT/Firewall 172 and then (optionally) tears down the TCH, 750A. The NAT/Firewall 172 detects the keep-alive packet from the selected assisting UE(s) 605 as traffic in association with the NAT and/or firewall states for the given client application and thereby resets or restarts the traffic inactivity timer for the given client application, 755A. As will be appreciated, 745A through 755A can repeat any number of times such that the NAT and/or firewall states for the given client application on UE 200 can be maintained for an indefinite period of time. Similarly, 745A through 755A can repeat any number of times for one or more other UE(s) 200 whereby at least one assisting UE 605 can send keep alive packets on behalf of multiple UEs 200. In other words, the process shown in FIG. 7A can be executed concurrently on behalf of a plurality of UEs and/or on behalf a plurality of a plurality of client applications for a given UE.

At some later point in time, while the NAT and firewall states for the given client application remain active, the application server 170 sends mobile-terminated data to the NAT/Firewall 172 for transmission to the given client application on UE 200, 760A. The NAT/Firewall 172 receives the mobile-terminated data, performs any necessary translation functions and then forwards the mobile-terminated data to the RAN 120 (e.g., via a SSGN/GGSN, via a PDSN, etc.) for transmission to UE 200, 765A.

Figure 7B:
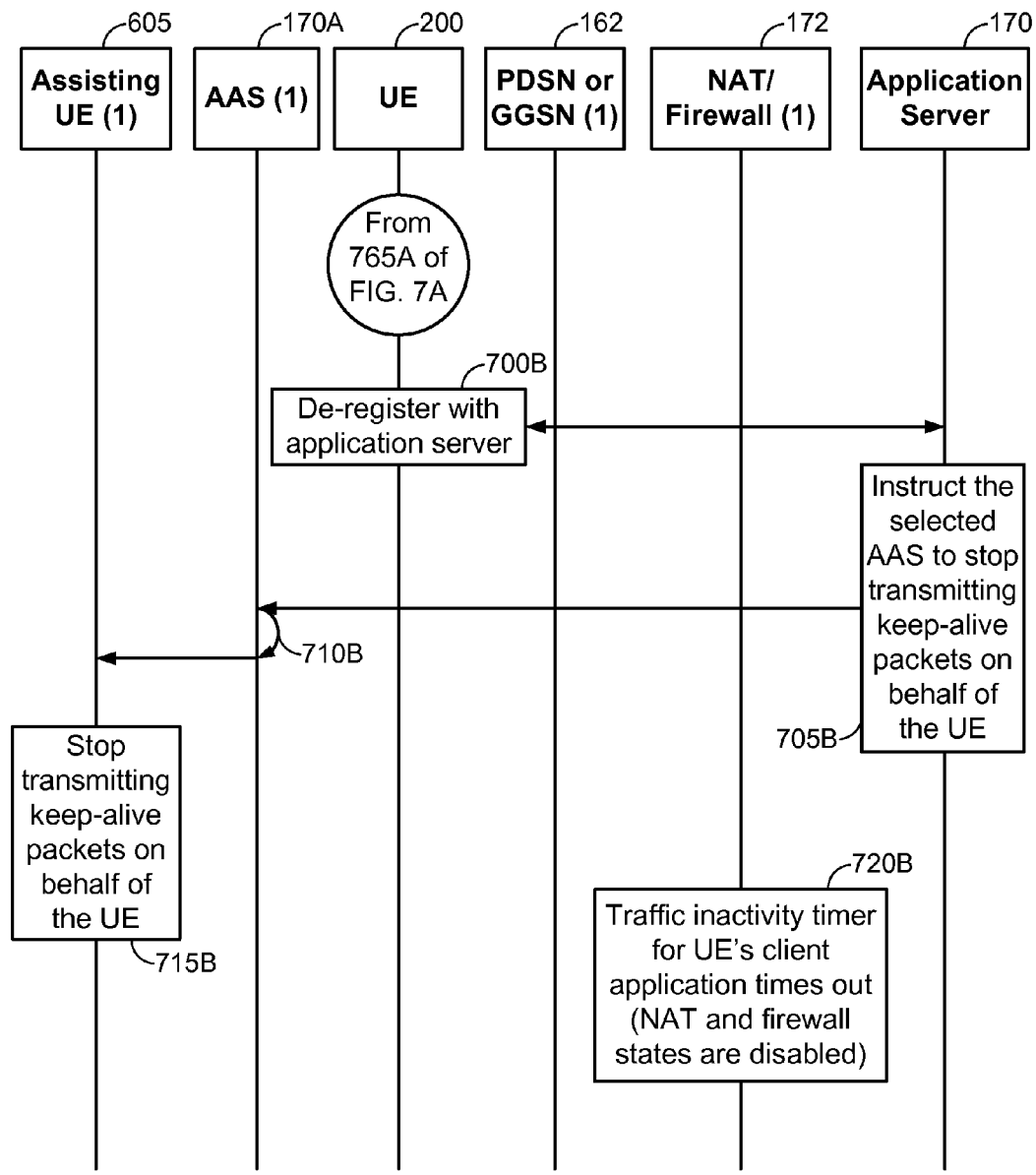
FIG. 7B illustrates a continuation of the process of FIG. 7A in accordance with an embodiment of the invention.

FIG. 7B illustrates a continuation of the process of FIG. 7A in accordance with an embodiment of the invention. Referring to FIG. 7B, at some point after 765A of FIG. 7A, assume that the given client application on UE 200 determines to de-register from the application server 170. For example, a user of UE 200 may choose not to extend a service subscription associated with the given client application. In this case, UE 200 de-registers the given client application with the application server 170 in 700B. Upon de-registering the given client application at the application server 170, the application server 170 determines that the NAT and/or firewall states for the given client application need not be maintained by the NAT/Firewall 172. Thus, the application server 170 instructs AAS 170A to stop transmitting keep-alive packets on behalf of the given client application of UE 200, 705B. The AAS 170A within the packet core (1) receives the instructions from the application server 170 and in turn instructs the selected assisting UE(s) 605 to stop transmitting the periodic keep-alive packets for UE 200, 710B. The selected assisting UE(s) 605 receives the instructions from the AAS 170A and stops transmitting the periodic keep-alive packets for UE 200, 715B. However, it will be appreciated that the assisting UE(s) 605 may continue to transmit periodic keep alive packets for other client applications of UE 200 and/or for other UE(s) altogether. At some later point in time, the traffic inactivity timer(s) for the given client application expires at the NAT/Firewall 172, 720B, such that the NAT/Firewall 172 tears down the NAT and/or firewall states that were set-up for the given client application of UE 200.

Figure 7C:
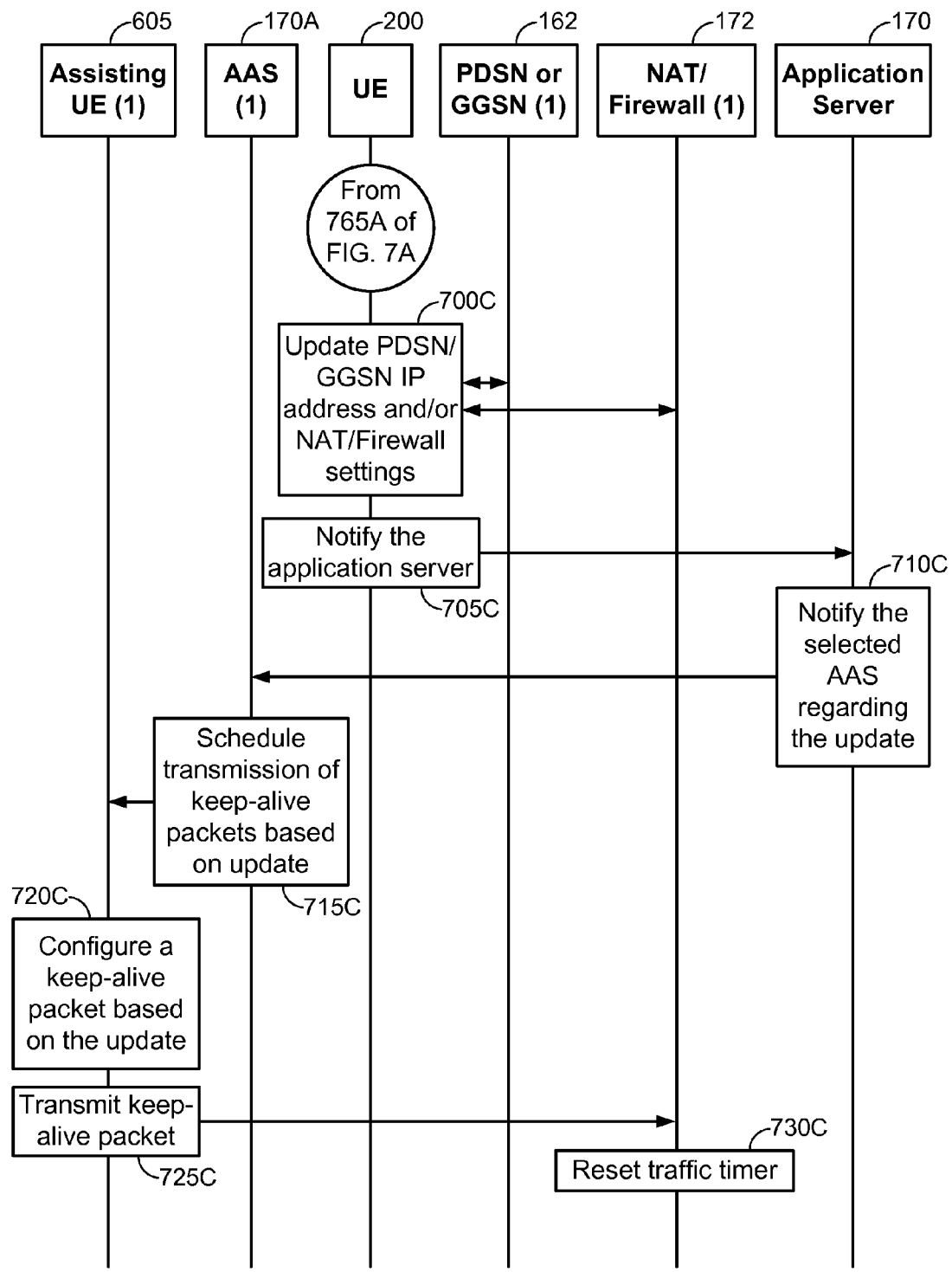
FIG. 7C illustrates a continuation of the process of FIG. 7A in accordance with another embodiment of the invention.

FIG. 7C illustrates a continuation of the process of FIG. 7A in accordance with another embodiment of the invention. Referring to FIG. 7C, at some point after 765A of FIG. 7A, assume that the settings associated with the given client application are updated in some manner that affect the manner in which the keep-alive packets must be configured to result in a reset or restart of the associated traffic inactivity timer at the NAT/Firewall 172, 700C. In this embodiment, it will be further assumed that the causation of the update is not a handoff of UE 200 to a different packet core altogether, such that UE 200 remains in packet core (1) throughout the process of FIG. 7C. In an example, the IP address of the PDSN or GGSN may have changed, the private and/or public port numbers and/or IP address of the given client application may have changed and so on. Alternatively, the IP address assigned by the PDSN or the GGSN to the UE may have changed as a result of a re-negotiation of air interface and packet data session resources. As will be appreciated, any of the above noted events can trigger the update for the IP address and port mapping at the application server 170.

After updating the settings in 700C, UE 200 notifies the application server 170 with regard to the updated settings, 705C. The application server 170 in turn notifies the AAS 170A regarding the update, 710C, and the AAS 170A in turn notifies the selected assisting UE(s) 605 with regard to the update so that the selected assisting UE(s) 605 can modify the manner in which the periodically transmitted keep-alive packets are configured, 715C.

In 720C, the selected assisting UE(s) 605 configure a keep-alive packet in a manner that conforms with UE 200 in accordance with the updated setting-information. For example, if the updated setting-information corresponds to a change in the given client application's public IP address, then the selected assisting UE(s) 605 configure subsequent keep-alive packets with the updated public IP address in 720C, and so on.

After configuring the keep-alive packet in 720C, the selected assisting UE(s) 605 set-up a TCH with the RAN 120 (if necessary), transmit the configured keep-alive packet to the application server 170 via the NAT/Firewall 172 and then (optionally) tear down the TCH, 725C. The NAT/Firewall 172 detects the keep-alive packet from the selected assisting UE(s) 605 as traffic in association with the NAT and/or firewall states for the given client application and thereby resets or restarts the traffic inactivity timer for the given client application, 730C. As will be appreciated, 720C through 730C can repeat any number of times such that the NAT and/or firewall states for the given client application on UE 200 can be maintained for an indefinite period of time. Similarly, 720C through 730C can repeat any number of times for one or more other UE(s) 200 within packet core (1) whereby at least one assisting UE 605 is sending keep alive packets on behalf of multiple UEs 200. In other words, the process shown in FIG. 7C can be executed concurrently on behalf of a plurality of UEs and/or on behalf of a plurality of client applications for a given UE.

Figure 7D:
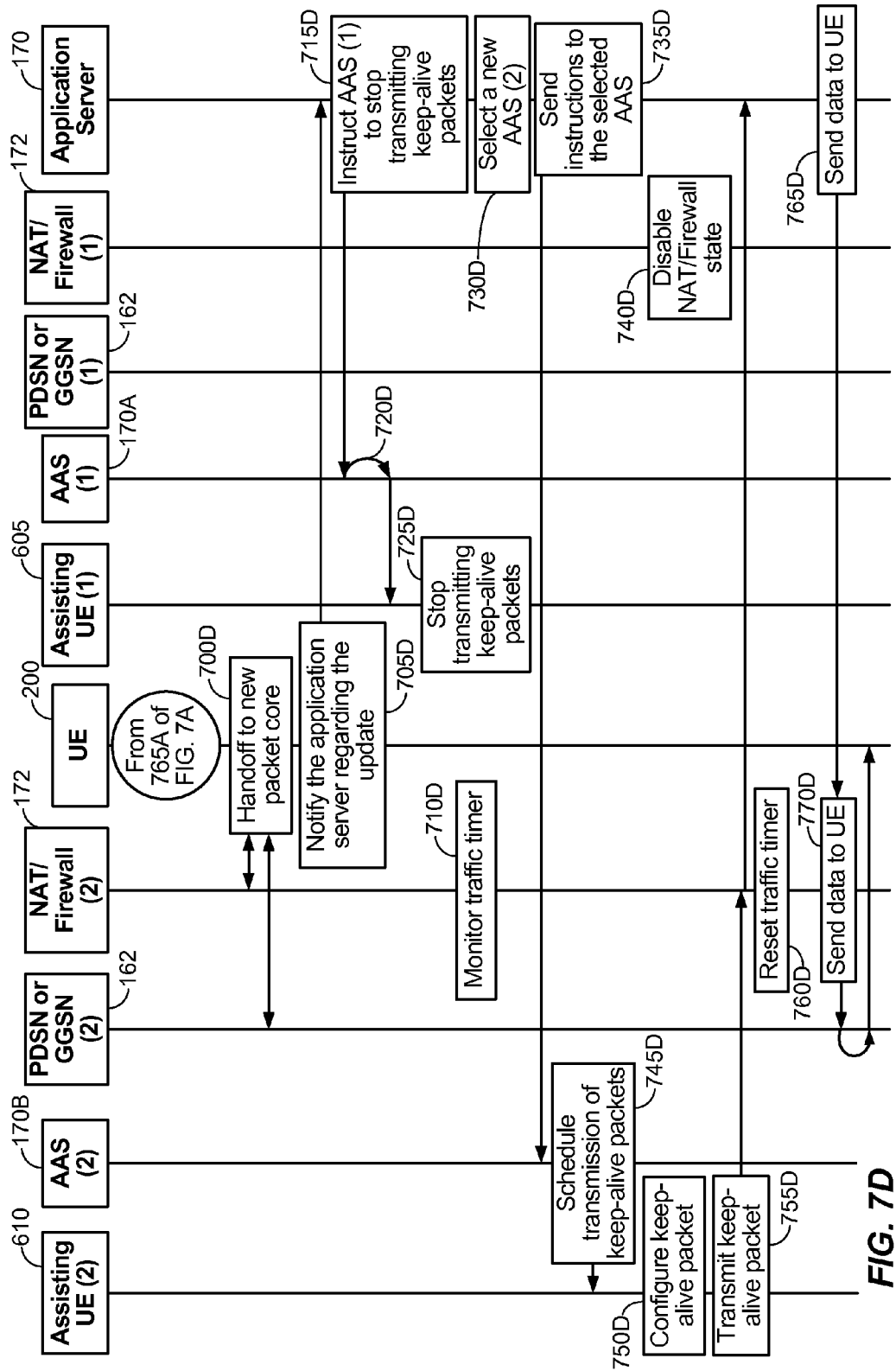
FIG. 7D illustrates yet another continuation of the process of FIG. 7A in accordance with another embodiment of the invention.

FIG. 7D illustrates yet another continuation of the process of FIG. 7A in accordance with another embodiment of the invention. Referring to FIG. 7D, at some point after 765A of FIG. 7A, assume that UE 200 hands off from packet core (1) to packet core (2), 700D. For example, a handoff of UE 200 from one packet core to another can occur when UE 200 hands off from a first base station in a first subnet that is behind a first NAT/Firewall 172 to a second base station in a second subnet that is behind a second NAT/Firewall 172. Similarly, a handoff of UE 200 from one packet core to another can occur when the UE 200 transitions from a first RNC (or BSC) on a first GGSN (or PDSN) 162 behind a first NAT/Firewall 172 in packet core (1) to a second RNC (or BSC) on a second GGSN (or PDSN) 162 behind a second NAT/Firewall 172 in a packet core (2).

While not shown explicitly in FIG. 7D, it will be appreciated the handoff of 700D can include (i) obtaining the IP address of the PDSN or GGSN of packet core (2), (ii) setting up the NAT and firewall states with the NAT/Firewall 172 of packet core (2) and (iii) obtaining new private and public port numbers and IP addresses for UE 200 (if necessary). In other words, blocks 701A, 702A and 715A of FIG. 7A can be performed at 700D within packet core (2), if necessary.

After performing the handoff from packet core (1) to packet core (2), UE 200 notifies the application server 170 with regard to the new settings of UE 200 subsequent to the handoff (e.g., the IP address of the PDSN or GGSN in packet core (2), etc., as in 715A of FIG. 7A), 705D. Also, after performing the handoff, the NAT/Firewall 172 in the packet core (2) begins to monitor a traffic inactivity timer for the given client application, 710D. As will be appreciated, the traffic inactivity timer has an associated expiration period such that the NAT and/or firewall states for the given client application are torn down upon expiration of the associated traffic inactivity timer.

After the application server 170 is notified of the handoff of UE 200 from packet core (1) to packet core (2), the application server 170 determines that the NAT and firewall states no longer need to be maintained for the given client application in packet core (1). Accordingly, the application server 170 instructs AAS 170A to stop transmitting keep-alive packets on behalf of the given client application of UE 200, 715D. The AAS 170A within the packet core (1) receives the instructions from the application server 170 and in turn instructs the selected assisting UE(s) 605 in packet core (1) to stop transmitting the periodic keep-alive packets for UE 200, 720D. The selected assisting UE(s) 605 receive the instructions from the AAS 170A and stop transmitting the periodic keep-alive packets, 725D. However, if necessary, the assisting UE(s) 605 in packet core (1) can continue to send keep alive messages for other UE(s) that are still associated with packet core (1).

Also, after the application server 170 is notified of the handoff of UE 200 from packet core (1) to packet core (2), the application server 170 selects an assisting application server (AAS) in packet core (2) based on the IP address of the PDSN or GGSN that was reported by UE 200 to the application server 170 in 705D, 730D. For example, the application server 170 can use the IP address of the PDSN or GGSN in packet core (2) to identify an AAS that associates with the application server 170 and is also located in the same packet core (2) as UE 200. The application server 170 can then select the co-located AAS (i.e., AAS 170B) in the same packet core (2) as UE 200 in 730D.

After selecting the AAS 170B based on the IP address of the PDSN or GGSN in the packet core (2) in 730D, the application server 170 instructs the selected AAS (i.e., AAS 170B) to transmit keep-alive packets on behalf of the given client application of UE 200, 735D. In this case, the selected AAS corresponds to AAS 170B within the packet core (2).

Also, at some point in time, the traffic inactivity timer for the given client application expires at the NAT/Firewall 172 of packet core (1), 740D, due to the cessation of keep-alive packet transmissions by the selected assisting UE(s) 605 in packet core (1) in 725D. Accordingly, in 740D, assume that this traffic inactivity timer expires, and that the NAT/Firewall 172 in packet core (1) tears down the NAT and/or firewall states that were set-up for the given client application of UE 200.

The AAS 170B receives the instructions from the application server 170 and then selects one or more of its coupled, assisting UEs 610 in packet core (2) to be responsible for periodically transmitting keep-alive packets on behalf of the given client application of UE 200 in packet core (2), 745D. The AAS 170B then instructs the selected UE(s) 610 to begin transmitting keep-alive packets to the application server 170 on a periodic basis, 745D. In an embodiment, the transmission interval or period for keep-alive packet repetition is established to be no greater than the expiration period of the associated traffic inactivity timer (e.g., 30 seconds, 1 minute, etc.) that is maintained at the NAT/Firewall 172 in the packet core (2).

In 750D, the selected assisting UE(s) 610 configure a keep-alive packet in a manner that conforms with UE 200 in the packet core (2) (e.g., see similar to 745A of FIG. 7A). After configuring the keep-alive packet in 750D, the selected assisting UE(s) 610 set-up a TCH with the RAN 120 (if necessary), transmit the configured keep-alive packet to the application server 170 via the NAT/Firewall 172 and then (optionally) tear down the TCH, 755D. The NAT/Firewall 172 of the packet core (2) detects the keep-alive packet from the selected assisting UE(s) 610 as traffic in association with the NAT and/or firewall states for the given client application and thereby resets or restarts the traffic inactivity timer for the given client application, 760D. As will be appreciated, 750D through 760D can repeat any number of times such that the NAT and/or firewall states for the given client application on UE 200 can be maintained for an indefinite period of time in packet core (2). Similarly, 750D through 760D can repeat any number of times to maintain NAT and/or firewall states for one or more other client applications on the same UE 200 and/or one or more other UEs altogether.

At some later point in time, while the NAT and firewall states for the given client application remain active in packet core (2), the application server 170 sends mobile-terminated data to the NAT/Firewall 172 in packet core (2) for transmission to the given client application on UE 200, 765D. The NAT/Firewall 172 in packet core (2) receives the mobile-terminated data, performs any necessary translation functions and then forwards the mobile-terminated data to the RAN 120 (e.g., via a SSGN/GGSN, via a PDSN, etc.) for transmission to UE 200, 770D.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a mobile communications device positioned within an internal network, the internal network being separated from one or more external networks by network address translation (NAT) and/or a firewall, comprising:
   establishing NAT and/or firewall settings by which the mobile communications device can be contacted through the NAT and/or firewall from the one or more external networks, the NAT and/or firewall settings configured to be disabled after a threshold period of traffic inactivity; and
   refraining from transmitting keep-alive packets from the mobile communications device based on an expectation that one or more assisting wireless communications devices within the internal network will be instructed to transmit the keep-alive packets on behalf of the mobile communications device so as to maintain the established NAT and/or firewall settings for the mobile communications device.

2. The method of claim 1, further comprising:
   registering at least one client application on the mobile communications device with an application server that is configured to support the at least one client application, the application server being positioned within the one or more external networks.

3. The method of claim 2, further comprising:
   obtaining an application-layer Internet Protocol (IP) address that is associated with a packet data end point positioned behind the NAT and/or firewall along with the mobile communications device,
   wherein the registering step includes reporting the IP address of the packet data end point to the application server.

4. The method of claim 2, wherein the application server instructs an assisting application server within the internal network to transmit the keep-alive packets on behalf of the mobile communications device so as to maintain the established NAT and/or firewall settings.

5. The method of claim 4, wherein the assisting application server within the internal network instructs the one or more wireless communications devices to transmit the keep-alive packets on behalf of the mobile communications device so as to maintain the established NAT and/or firewall settings.

6. The method of claim 1, wherein a transmission interval between transmissions of the keep-alive packets by the one or more assisting wireless communications devices is no greater than the threshold period of traffic inactivity.

7. A method of operating an application server positioned within an external network and configured to support at least one client application on a mobile communications device positioned within an internal network, the internal network being separated from the external network by network address translation (NAT) and/or a firewall, comprising:
   receiving information associated with NAT and/or firewall settings by which the mobile communications device can be contacted through the NAT and/or firewall from the external network, the NAT and/or firewall settings configured to be disabled after a threshold period of traffic inactivity; and
   instructing an assisting application server within the internal network to transmit keep-alive packets on behalf of the mobile communications device so as to maintain the established NAT and/or firewall settings for the mobile communications device.

8. The method of claim 7, wherein the mobile communications device is permitted to refrain from transmitting the keep-alive packets based on an expectation the keep-alive packets will be transmitted on its behalf within the internal network.

9. The method of claim 7, wherein the instructing step instructs the assisting application server to instruct one or more assisting wireless communications devices within the internal network to transmit the keep-alive packets on behalf of the mobile communications device so as to maintain the established NAT and/or firewall settings.

10. The method of claim 7, wherein the received information corresponds to an initial registration of the at least one client application with the application server.

11. The method of claim 10, wherein the received information corresponds to a notification that the established NAT and/or firewall settings have been updated.

12. The method of claim 11, wherein the update of the established NAT and/or firewall settings is based on a handoff of the mobile communications device from the internal network to another internal network that is separated from the external network by another NAT and/or firewall.

13. The method of claim 11, wherein the update of the established NAT and/or firewall settings is not based on a handoff of the mobile communications device from the internal network to another internal network that is separated from the external network by another NAT and/or firewall.

14. The method of claim 7, wherein a transmission interval between transmissions of the keep-alive packets by the one or more assisting wireless communications devices is no greater than the threshold period of traffic inactivity.

15. A method of operating an assisting application server positioned within an internal network that is associated with an application server positioned within an external network and configured to support at least one client application on a mobile communications device positioned within the internal network, the internal network being separated from the external network by network address translation (NAT) and/or a firewall, comprising:
  receiving instructions from the application server to transmit keep-alive packets on behalf of the mobile communications device so as to maintain NAT and/or firewall settings by which the mobile communications device can be contacted through the NAT and/or firewall from the external network, the NAT and/or firewall settings configured to be disabled after a threshold period of traffic inactivity; and
  instructing one or more assisting wireless communications devices within the internal network to transmit keep-alive packets on behalf of the mobile communications device so as to maintain the established NAT and/or firewall settings.

16. The method of claim 15, further comprising:
  receiving supplemental instructions from the application server that update the manner in which the keep-alive packets are to be configured for transmission.

17. The method of claim 15, further comprising:
  receiving supplemental instructions from the application server that request that the assisting application server stop transmitting the keep-alive packets on behalf of the mobile communications device.

18. The method of claim 15, wherein a transmission interval between transmissions of the keep-alive packets by the one or more assisting wireless communications devices is no greater than the threshold period of traffic inactivity.

19. A method of operating an assisting wireless communications device positioned within an internal network that is coupled to an assisting application server also positioned within the internal network, the assisting application server further associated with an application server positioned within an external network and configured to support at least one client application on a mobile communications device positioned within the internal network, the internal network being separated from the external network by network address translation (NAT) and/or a firewall, comprising:
  receiving instructions from the assisting application server to transmit keep-alive packets on behalf of the mobile communications device so as to maintain NAT and/or firewall settings by which the mobile communications device can be contacted through the NAT and/or firewall from the external network, the NAT and/or firewall settings configured to be disabled after a threshold period of traffic inactivity; and
  transmitting the keep-alive packets in accordance with the received instructions.

20. The method of claim 19, wherein the transmitted keep-alive packets are each configured to masquerade as keep-alive packets sent by the mobile communications device such that one or more network entities receiving the transmitted keep-alive packets interpret the transmitted keep-alive packets as if sent by the mobile communications device instead of the assisting wireless communications device.

21. The method of claim 19, further comprising:
  receiving supplemental instructions from the assisting application server that update the manner in which the keep-alive packets are to be configured for transmission.

22. The method of claim 19, further comprising:
  receiving supplemental instructions from the assisting application server that request that the assisting wireless communications device stop transmitting the keep-alive packets on behalf of the mobile communications device.

23. The method of claim 19, wherein the transmitting step includes:
  transmitting the keep-alive packets at a transmission interval that is no greater than the threshold period of traffic inactivity.

24. A mobile communications device positioned within an internal network, the internal network being separated from one or more external networks by network address translation (NAT) and/or a firewall, comprising:
  means for establishing NAT and/or firewall settings by which the mobile communications device can be contacted through the NAT and/or firewall from the one or more external networks, the NAT and/or firewall settings configured to be disabled after a threshold period of traffic inactivity; and
  means for refraining from transmitting keep-alive packets from the mobile communications device based on an expectation that one or more assisting wireless communications devices within the internal network will be instructed to transmit the keep-alive packets on behalf of the mobile communications device so as to maintain the established NAT and/or firewall settings for the mobile communications device.

25. An application server positioned within an external network and configured to support at least one client application on a mobile communications device positioned within an internal network, the internal network being separated from the external network by network address translation (NAT) and/or a firewall, comprising:
  means for receiving information associated with NAT and/or firewall settings by which the mobile communications device can be contacted through the NAT and/or firewall from the external network, the NAT and/or firewall settings configured to be disabled after a threshold period of traffic inactivity; and
  means for instructing an assisting application server within the internal network to transmit keep-alive packets on behalf of the mobile communications device so as to maintain the established NAT and/or firewall settings for the mobile communications device.

26. An assisting application server positioned within an internal network that is associated with an application server positioned within an external network and configured to support at least one client application on a mobile communications device positioned within the internal network, the internal network being separated from the external network by network address translation (NAT) and/or a firewall, comprising:
- means for receiving instructions from the application server to transmit keep-alive packets on behalf of the mobile communications device so as to maintain NAT and/or firewall settings by which the mobile communications device can be contacted through the NAT and/or firewall from the external network, the NAT and/or firewall settings configured to be disabled after a threshold period of traffic inactivity; and
- means for instructing one or more assisting wireless communications devices within the internal network to transmit keep-alive packets on behalf of the mobile communications device so as to maintain the established NAT and/or firewall settings.

27. An assisting wireless communications device positioned within an internal network that is coupled to an assisting application server also positioned within the internal network, the assisting application server further associated with an application server positioned within an external network and configured to support at least one client application on a mobile communications device positioned within the internal network, the internal network being separated from the external network by network address translation (NAT) and/or a firewall, comprising:
- means for receiving instructions from the assisting application server to transmit keep-alive packets on behalf of the mobile communications device so as to maintain NAT and/or firewall settings by which the mobile communications device can be contacted through the NAT and/or firewall from the external network, the NAT and/or firewall settings configured to be disabled after a threshold period of traffic inactivity; and
- means for transmitting the keep-alive packets in accordance with the received instructions.

28. A mobile communications device positioned within an internal network, the internal network being separated from one or more external networks by network address translation (NAT) and/or a firewall, comprising:
- a processor;
- a memory;
- logic configured to establish NAT and/or firewall settings by which the mobile communications device can be contacted through the NAT and/or firewall from the one or more external networks, the NAT and/or firewall settings configured to be disabled after a threshold period of traffic inactivity; and
- logic configured to refrain from transmitting keep-alive packets from the mobile communications device based on an expectation that one or more assisting wireless communications devices within the internal network will be instructed to transmit the keep-alive packets on behalf of the mobile communications device so as to maintain the established NAT and/or firewall settings for the mobile communications device.

29. An application server positioned within an external network and configured to support at least one client application on a mobile communications device positioned within an internal network, the internal network being separated from the external network by network address translation (NAT) and/or a firewall, comprising:
- a processor;
- a memory;
- logic configured to receive information associated with NAT and/or firewall settings by which the mobile communications device can be contacted through the NAT and/or firewall from the external network, the NAT and/or firewall settings configured to be disabled after a threshold period of traffic inactivity; and
- logic configured to instruct an assisting application server within the internal network to transmit keep-alive packets on behalf of the mobile communications device so as to maintain the established NAT and/or firewall settings for the mobile communications device.

30. An assisting application server positioned within an internal network that is associated with an application server positioned within an external network and configured to support at least one client application on a mobile communications device positioned within the internal network, the internal network being separated from the external network by network address translation (NAT) and/or a firewall, comprising:
- a processor;
- a memory;
- logic configured to receive instructions from the application server to transmit keep-alive packets on behalf of the mobile communications device so as to maintain NAT and/or firewall settings by which the mobile communications device can be contacted through the NAT and/or firewall from the external network, the NAT and/or firewall settings configured to be disabled after a threshold period of traffic inactivity;
- and logic configured to instruct one or more assisting wireless communications devices within the internal network to transmit keep-alive packets on behalf of the mobile communications device so as to maintain the established NAT and/or firewall settings.

31. An assisting wireless communications device positioned within an internal network that is coupled to an assisting application server also positioned within the internal network, the assisting application server further associated with an application server positioned within an external network and configured to support at least one client application on a mobile communications device positioned within the internal network, the internal network being separated from the external network by network address translation (NAT) and/or a firewall, comprising:
- a processor;
- a memory;
- logic configured to receive instructions from the assisting application server to transmit keep-alive packets on behalf of the mobile communications device so as to maintain NAT and/or firewall settings by which the mobile communications device can be contacted through the NAT and/or firewall from the external network, the NAT and/or firewall settings configured to be disabled after a threshold period of traffic inactivity; and
- logic configured to transmit the keep-alive packets in accordance with the received instructions.

32. A non-transitory computer-readable storage medium containing instructions stored thereon, which, when executed by a mobile communications device positioned within an internal network, the internal network being separated from one or more external networks by network address translation (NAT) and/or a firewall, cause the mobile communications device to perform operations, the instructions comprising:
- program code to establish NAT and/or firewall settings by which the mobile communications device can be contacted through the NAT and/or firewall from the one or more external networks, the NAT and/or firewall settings configured to be disabled after a threshold period of traffic inactivity; and program code to refrain from transmitting keep-alive packets from the mobile communications device based on an expectation that one or more assisting wireless communications devices within the internal network will be instructed to transmit the keep-alive packets on behalf of the mobile communications device so as to maintain the established NAT and/or firewall settings for the mobile communications device.

33. A non-transitory computer-readable storage medium containing instructions stored thereon, which, when executed by an application server positioned within an external network and configured to support at least one client application on a mobile communications device positioned within an internal network, the internal network being separated from the external network by network address translation (NAT) and/or a firewall, cause the application server to perform operations, the instructions comprising:
  program code to receive information associated with NAT and/or firewall settings by which the mobile communications device can be contacted through the NAT and/or firewall from the external network, the NAT and/or firewall settings configured to be disabled after a threshold period of traffic inactivity; and
  program code to instruct an assisting application server within the internal network to transmit keep-alive packets on behalf of the mobile communications device so as to maintain the established NAT and/or firewall settings for the mobile communications device.

34. A non-transitory computer-readable storage medium containing instructions stored thereon, which, when executed by an assisting application server positioned within an internal network that is associated with an application server positioned within an external network and configured to support at least one client application on a mobile communications device positioned within the internal network, the internal network being separated from the external network by network address translation (NAT) and/or a firewall, cause the assisting application server to perform operations, the instructions comprising:
  program code to receive instructions from the application server to transmit keep-alive packets on behalf of the mobile communications device so as to maintain NAT and/or firewall settings by which the mobile communications device can be contacted through the NAT and/or firewall from the external network, the NAT and/or firewall settings configured to be disabled after a threshold period of traffic inactivity; and
  program code to instruct one or more assisting wireless communications devices within the internal network to transmit keep-alive packets on behalf of the mobile communications device so as to maintain the established NAT and/or firewall settings.

35. A non-transitory computer-readable storage medium containing instructions stored thereon, which, when executed by an assisting wireless communications device positioned within an internal network that is coupled to an assisting application server also positioned within the internal network, the assisting application server further associated with an application server positioned within an external network and configured to support at least one client application on a mobile communications device positioned within the internal network, the internal network being separated from the external network by network address translation (NAT) and/or a firewall, cause the assisting wireless communications device to perform operations, the instructions comprising:
  program code to receive instructions from the assisting application server to transmit keep-alive packets on behalf of the mobile communications device so as to maintain NAT and/or firewall settings by which the mobile communications device can be contacted through the NAT and/or firewall from the external network, the NAT and/or firewall settings configured to be disabled after a threshold period of traffic inactivity; and
  program code to transmit the keep-alive packets in accordance with the received instructions.

* * * * *